US010705943B2

(12) United States Patent
Makkar

(10) Patent No.: US 10,705,943 B2
(45) Date of Patent: Jul. 7, 2020

(54) AUTOMATING IDENTIFICATION OF TEST CASES FOR LIBRARY SUGGESTION MODELS

(71) Applicant: DevFactory Innovations FZ-LLC, Dubai (AE)

(72) Inventor: Tushar Makkar, Ambala (IN)

(73) Assignee: DevFactory Innovations FZ-LLC (AE)

( * ) Notice: Subject to any disclaimer, the term of this patent is extended or adjusted under 35 U.S.C. 154(b) by 0 days.

(21) Appl. No.: 15/699,505

(22) Filed: Sep. 8, 2017

(65) Prior Publication Data

US 2019/0079853 A1    Mar. 14, 2019

(51) Int. Cl.
| | | |
|---|---|---|
| G06F 11/36 | (2006.01) | |
| G06N 5/02 | (2006.01) | |
| G06F 8/36 | (2018.01) | |
| G06F 8/71 | (2018.01) | |
| G06F 8/73 | (2018.01) | |
| G06F 8/72 | (2018.01) | |
| G06F 8/33 | (2018.01) | |
| G06F 8/70 | (2018.01) | |
| G06F 8/75 | (2018.01) | |

(52) U.S. Cl.
CPC ............ *G06F 11/3684* (2013.01); *G06F 8/36* (2013.01); *G06F 8/71* (2013.01); *G06F 8/73* (2013.01); *G06N 5/022* (2013.01); *G06F 8/33* (2013.01); *G06F 8/70* (2013.01); *G06F 8/72* (2013.01); *G06F 8/75* (2013.01)

(58) Field of Classification Search
CPC . G06F 8/35; G06F 8/20; G06F 17/248; G06F 8/36; G06F 17/2705; G06F 11/3684
See application file for complete search history.

(56) References Cited

U.S. PATENT DOCUMENTS 5,694,540 A * 12/1997 Humelsine ............... G06F 8/71
714/33
6,308,178 B1    10/2001 Chang
(Continued)

OTHER PUBLICATIONS

Chang Liu et al.; LtRules an Automated Software Library Usage Rule Extraction Tool; ACM; pp. 823-826; retrieved on Feb. 18, 2020 (Year: 2006).*

(Continued)

*Primary Examiner* — S. Sough
*Assistant Examiner* — Cuong V Luu
(74) *Attorney, Agent, or Firm* — Terrile, Cannatti & Chambers, LLP

(57) ABSTRACT

A library model addition engine adds library models to a library knowledge base by defining a template for a library configuration file that conveys information about each library model, custom inputs and code snippets to facilitate library comparison operations, and education content for the library model, where the library configuration file template may be automatically filled by populating selected data fields in the template with information identifying the library model, scraping documentation pages to extract test cases, and then scraping test case code to extract the test case input parameters for input to an input/output matching engine to evaluate a repository of code snippets and identify a set of functionally similar code snippets for inclusion one or more data fields in the template.

19 Claims, 8 Drawing Sheets

(56) References Cited

U.S. PATENT DOCUMENTS

| | | | |
|---|---|---|---|
| 7,039,898 B2 | 5/2006 | Shah | |
| 7,617,491 B1 | 11/2009 | Nedderman | |
| 8,103,671 B2 | 1/2012 | Gupta | |
| 8,510,762 B1* | 8/2013 | Gregorio | G06F 8/36 717/104 |
| 8,627,290 B2* | 1/2014 | Clee | G06F 8/71 717/125 |
| 8,631,385 B2* | 1/2014 | Ali | G06F 8/35 717/104 |
| 8,676,853 B2 | 3/2014 | Kasravi et al. | |
| 8,826,237 B2 | 9/2014 | Balasubramanian | |
| 8,843,889 B2* | 9/2014 | Anderson | G06F 8/70 717/120 |
| 8,881,122 B1 | 11/2014 | Klimek et al. | |
| 8,966,442 B2 | 2/2015 | Eska et al. | |
| 9,317,258 B2* | 4/2016 | Cummings | G06F 8/35 |
| 9,436,463 B2* | 9/2016 | Sass | G06F 8/751 |
| 9,519,464 B2* | 12/2016 | Dang | G06F 8/36 |
| 9,886,670 B2 | 2/2018 | Dirac et al. | |
| 10,048,945 B1 | 8/2018 | Makkar | |
| 10,216,812 B2 | 2/2019 | Witkop et al. | |
| 10,360,190 B2 | 7/2019 | Hansen | |
| 2006/0123000 A1 | 6/2006 | Baxter et al. | |
| 2006/0265688 A1 | 11/2006 | Carlson et al. | |
| 2007/0168946 A1 | 7/2007 | Drissi et al. | |
| 2008/0052690 A1 | 2/2008 | Bharadwaj | |
| 2009/0150859 A1* | 6/2009 | Cummings | G06F 8/34 717/104 |
| 2010/0199263 A1 | 8/2010 | Clee et al. | |
| 2010/0218165 A1* | 8/2010 | Ali | G06F 8/35 717/104 |
| 2011/0296386 A1 | 12/2011 | Woollen et al. | |
| 2013/0055235 A1 | 2/2013 | Eska et al. | |
| 2013/0086558 A1* | 4/2013 | Merino | G06F 11/3688 717/128 |
| 2013/0144920 A1 | 6/2013 | Boyd | |
| 2014/0109049 A1 | 4/2014 | Kaulgud et al. | |
| 2015/0154011 A1 | 6/2015 | Ceng et al. | |
| 2015/0295759 A1 | 10/2015 | Mollersten | |
| 2015/0378692 A1* | 12/2015 | Dang | G06F 8/36 717/106 |
| 2015/0379423 A1 | 12/2015 | Dirac et al. | |
| 2016/0127418 A1 | 5/2016 | Maes et al. | |
| 2016/0149761 A1 | 5/2016 | Liu | |
| 2016/0202972 A1* | 7/2016 | Sass | G06F 8/751 717/121 |
| 2016/0321039 A1 | 11/2016 | Chaudhuri et al. | |
| 2016/0357519 A1 | 12/2016 | Vargas | |
| 2017/0185395 A1 | 6/2017 | Arians et al. | |
| 2017/0192880 A1 | 7/2017 | Ramakrishnan et al. | |
| 2018/0024816 A1 | 1/2018 | Au et al. | |
| 2018/0060300 A1 | 3/2018 | Radostev | |
| 2018/0109421 A1 | 4/2018 | Laribi et al. | |
| 2018/0173522 A1* | 6/2018 | Hamill | G06F 8/73 |

OTHER PUBLICATIONS

Denhis M. Volpano et al.; Software Templates; IEEE; pp. 55-60; retrieved on Feb. 18, 2020 (Year: 1985).*

Ferosh Jacob and Robert Tairas, Code Template Inference Using Language Models, Proceedings of the 48th Annual Southeast Regional Conference of the Association for Computing Machinery, Apr. 15-17, 2010, pp. 1-6, Article No. 104, Association for Computing Machinery, New York, NY.

Fang-Hsiang Su, Jonathan Bell, Gail Kaiser, and Simha Sethumadhavan, Identifying Functionally Similar Code in Complex Codebases, 2016 IEEE 24th International Conference on Program Comprehension (ICPC), May 16-17, 2016, pp. 1-10, IEEE.

International Search Report dated Jan. 2, 2019, in PCT/US2018/050284, pp. 1-6.

Written Opinion of the International Searching Authority dated Jan. 2, 2019, in PCT/US2018/050284, pp. 1-11.

International Search Report dated Nov. 26, 2018, in PCT/US2018/050219, pp. 1-5.

Written Opinion of the International Searching Authority dated Nov. 26, 2018, in PCT/US2018/050219, pp. 1-9.

International Search Report dated Dec. 17, 2018, in PCT/US2018/050227, pp. 1-5.

Written Opinion of the International Searching Authority dated Dec. 17, 2018, in PCT/US2018/050227, pp. 1-7.

International Search Report dated Dec. 17, 2018, in PCT/US2018/050281, pp. 1-6.

Written Opinion of the International Searching Authority dated Dec. 17, 2018, in PCT/US2018/050281, pp. 1-8.

Non-Final Office Action dated Nov. 29, 2018, mailed in U.S. Appl. No. 15/699,470, pp. 1-44.

Response to Non-Final Office Action dated Nov. 29, 2018, as filed in U.S. Appl. No. 15/699,470, filed May 29, 2019, pp. 1-26.

Non-Final Office Action dated Nov. 29, 2018, mailed in U.S. Appl. No. 15/699,477, pp. 1-39.

Response to Non-Final Office Action dated Nov. 29, 2018, as filed in U.S. Appl. No. 15/699,477, filed May 29, 2019, pp. 1-25.

Non-Final Office Action dated Nov. 29, 2018, mailed in U.S. Appl. No. 15/699,489, pp. 1-43.

Response to Non-Final Office Action dated Nov. 29, 2018, as filed in U.S. Appl. No. 15/699,4895, filed May 29, 2019, pp. 1-27.

Mukund Raghothaman, et al, SWIM: Synthesizing What I Mean: Code Search and Idiomatic Snippet Synthesis, 2016, pp. 1-11, Cambridge.

Naoya Murakami, et al, Optimizing a Search-Based Code Recommendation System, 2012, pp. 1-5, University of Tokyo, Tokyo, Japan.

Notice of Allowance dated Dec. 10, 2019 in U.S. Appl. No. 15/699,470, pp. 1-5.

Response to Final Office Action dated Nov. 18, 2019 in U.S. Appl. No. 15/699,470, p. 6.

Terminal Disclaimer dated Nov. 19, 2019 in U.S. Appl. No. 15/699,470, pp. 7-9.

Response to Final Office Action dated Nov. 18, 2019 in U.S. Appl. No. 15/699,470, pp. 10-18.

Final Rejection dated Jun. 17, 2019 in U.S. Appl. No. 15/699,470, pp. 19-25.

Notice of Allowance dated Jul. 2, 2019 in U.S. Appl. No. 15/699,489, pp. 1-11.

The Gambit Collaboration: Peter Athron, et al, Gambit: the global and modular beyond-the-stand-model inference tool, The European Physical Journal C, Published online Feb. 2, 2018, pp. 1-9. Europe.

Terminal Disclaimer dated Jan. 7, 2010 in U.S. Appl. No. 15/699,477, pp. 1-4.

Response to Final Office Action dated Dec. 17, 2019 in U.S. Appl. No. 15/699,477, pp. 5-13.

Final Rejection dated Jul. 17, 2019 in U.S. Appl. No. 15/699,477, p. 14-27.

* cited by examiner

FIG. 4B

```
☆ Samy Library Suggestion ✕ / 🗋 aLine Continuous Integrati ✕ / ⓘ 12:17 until your session tim ✕ / 🗋 Library Suggestion Engine ✕        Tushar ← → ⟲ 🔒 52.3.249.66:10000/products/697/jobs?job=23510 smumtaz  |  build #113  |  ⊙ 08/10/2015 07:23 PM GST                              ✕ close Code Reduction Opportunity

| File | Auto-Classification | Line(s) of Replaceable Code | Code Reduction | Library |
|------|---------------------|-----------------------------|----------------|---------|
| /test/FileReaderTrialTrue.java | File Operation | Current: ☐ 7 lines  Proposed: ☐ 3 lines | 57% | ☐ |
                    413                       414                      415       416

412                                                                                         PTED
401                                                                                         PTED
                                                                                            PTED
                                                                                  417
 1  package example;
 2  import java.io.*;
 3  import java.io.BufferedReader;
 4
 5 ▸ class FileReaderTrialTrue {
 6
 7 ▸   public static String readFile3(InputStream is) throws IOException {
 8        StringBuilder sb = new StringBuilder();
 9        Scanner sc = new Scanner(is);
10 ▸      while(sc.hasNextLine()) {
11           sb.append(sc.nextLine()).append("\n");
12        }
13        sc.close();
14        return sb.toString();
15     }
16
17 ▸   public static String join(){
18        String[] toJoin = {"hello", "world"};
   419
```

410
418

AUTOMATING IDENTIFICATION OF TEST CASES FOR LIBRARY SUGGESTION MODELS

CROSS REFERENCE TO RELATED APPLICATIONS

U.S. patent application Ser. No. 15/699,470, entitled "Library Model Addition" by Tushar Makkar, filed on same day herewith, which is incorporated by reference in its entirety as if fully set forth herein.

U.S. patent application Ser. No. 15/699,477, entitled "Automating Generation of Library Suggestion Engine Models" by Tushar Makkar, filed on same day herewith, which is incorporated by reference in its entirety as if fully set forth herein.

U.S. patent application Ser. No. 15/699,489, entitled "Automating Identification of Code Snippets for Library Suggestion Models" by Tushar Makkar, filed on same day herewith, which is incorporated by reference in its entirety as if fully set forth herein.

BACKGROUND OF THE INVENTION

Field of the Invention

The present invention is directed in general to field of information processing. In one aspect, the present invention relates generally to a software program development tool, method, and apparatus in a data processing system.

Description of the Related Art

Computer programmers, developers, coders and/or software engineers write, test, debug, and maintain computer software or code instructions, called computer programs, which computers must follow to perform their functions. When writing or making changes to computer program to address new or unique technical challenges, programmers often create new, original and unique programming source code which can, unfortunately, suffer from performance limitations and other sub-optimalities. For example, a programmer's unique source code may include a number of undetected software bugs or otherwise suffer from low quality or robustness if the code has not been thoroughly tested, or may have reduced performance functionality if the code is outdated or has not been updated or maintained. Unique source code is often also bloated and less readable than desired due to inefficiencies in the computer program's use of memory, disk space, processing power, or other hardware resources whilst making only dubious user-perceptible improvements or suffering from feature creep. Programmers can address many of these problems by using libraries of basic code that can be modified or customized for a specific application, thereby yielding more reliable and consistent programs and increasing the programmer's productivity. However, there are significant difficulties with using libraries in that a significant amount of effort, knowledge, and experience is needed in order to correctly identify a suitable library from among thousands of stored library files, to understand the performance and coding requirements of the library, and to make any required code adjustments thereto. In addition, the responsibility for using a library typically resides with the programmer or code reviewer, making it difficult to track and enforce library usage. There are similar challenges with developing, updating and expanding existing library databases since there are no standardized mechanisms for generating, vetting, and adding library functions to an existing library knowledge base. In the absence of control procedures for reviewing and validating proposed library additions, an uploaded library file can corrupt or damage the library knowledge base. Thus, while the use of libraries is considered a best practice for software development, the existing solutions for adding library functions to promote library use are extremely difficult at a practical level by virtue of the difficulty in identifying, uploading, adding, adopting, and modifying libraries.

SUMMARY OF THE INVENTION

A system, apparatus, and methodology are described for efficiently improving code reuse and improving codebase maintainability by automating the addition of library functions to a library recommendation engine which identifies library functions for replacement or substitution of source code which is written by developers. In selected embodiments, a human-readable data serialization language, such as YAML Ain't Markup Language (YAML), is used to specify a library configuration file format for onboarding library functions, where the library configuration file represents the data needed to recognize a single function in the library. In an example YAML configuration file, the library function is specified by the developer/library owner in terms of a library information (e.g., library name, function name, library descriptors, documentation link(s) for the library function, library code link(s), method signature, transform function snippets, etc.), sample inputs and/or outputs for the library function (e.g., inputs for blackbox and whitebox matching engines), functionally similar code snippets to help establish a pattern for the library code, and educational content for the library function. Though the specified content of the library configuration file may be input by the developer, the configuration file may be automatically generated or auto-templated, such as by scraping the webpage of a given library documentation link to populate the configuration file with specified values (e.g., library function signature, documentation link, etc.) in a specified format (e.g., YAML) without developer intervention at all. Once the library configuration file format is specified for onboarding, the configuration file is submitted to a library model addition engine which validates the input library configuration file to ensure that the file is in the correct format and satisfies the constraints provided by the library recommendation engine. In selected embodiments, a YAML validator may be implemented as a Python® package which validates whether the content of YAML configuration file is correct or not. ("Python" is a registered trademark of the Python Software Foundation.) For example, the code snippets and transform function snippets from the library configuration file may be compiled as part of the validation process to check the correctness of the code snippets. Once validated, the approved library function is uploaded to the library knowledge base where it may be used to generate customized code suggestions for library function substitutions for a programmer's submitted source code. As described more fully hereinbelow, the library function substitution recommendations are generated by pruning the input source code to identify candidate code snippets from the source code which are matched with recommended library functions for substitution in the submitted source code. Selected embodiments of the disclosed system, apparatus, and methodology use machine learning, natural language processing (NLP), and/or artificial intelligence (AI) in combination with static and/or dynamic code analysis techniques to automatically analyze code and yield library substitution opportunities. As a result of the match processing, the programmer may be presented with one or more library function recommendations which may include code lines from input source code files along with code lines from the library function suggestion, alone or in combination with additional library function information identifying the code improvement recommendation and/or code reduction resulting from the library function recommendation and/or educational tutorial information relating to the implementation of the library function recommendation.

The objects, advantages and other novel features of the present invention will be apparent from the following detailed description when read in conjunction with the appended claims and attached drawings.

BRIEF DESCRIPTION OF THE DRAWINGS

The present invention may be understood, and its numerous objects, features and advantages obtained, when the following detailed description of a preferred embodiment is considered in conjunction with the following drawings.

FIG. 4B is a second screen shot of a user interface of a library suggestion engine which illustrates a code reduction opportunity for an input source code file in accordance selected embodiments of the present disclosure.

DETAILED DESCRIPTION

A library model addition engine, methodology, and apparatus are described for adding a candidate library model to a library knowledge base by generating and validating a library configuration file containing data needed to recognize the library model, including automatically generated test cases that are identified by scraping documentation pages to extract test files which are scraped to extract the test case input parameters. As disclosed herein, the test case input parameters may be extracted by parsing and pruning the test files, finding parameters to the candidate library model which will provide test cases with a diversity, breadth and depth, and resolving the parameters definition along with imports. The resulting test case input parameters can be passed to an input/output matching engine which evaluates open source projects to identify functionally similar code snippets for use with an internal or whitebox matching engine. While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the data processing arts to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as processing, computing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

Figure 1:
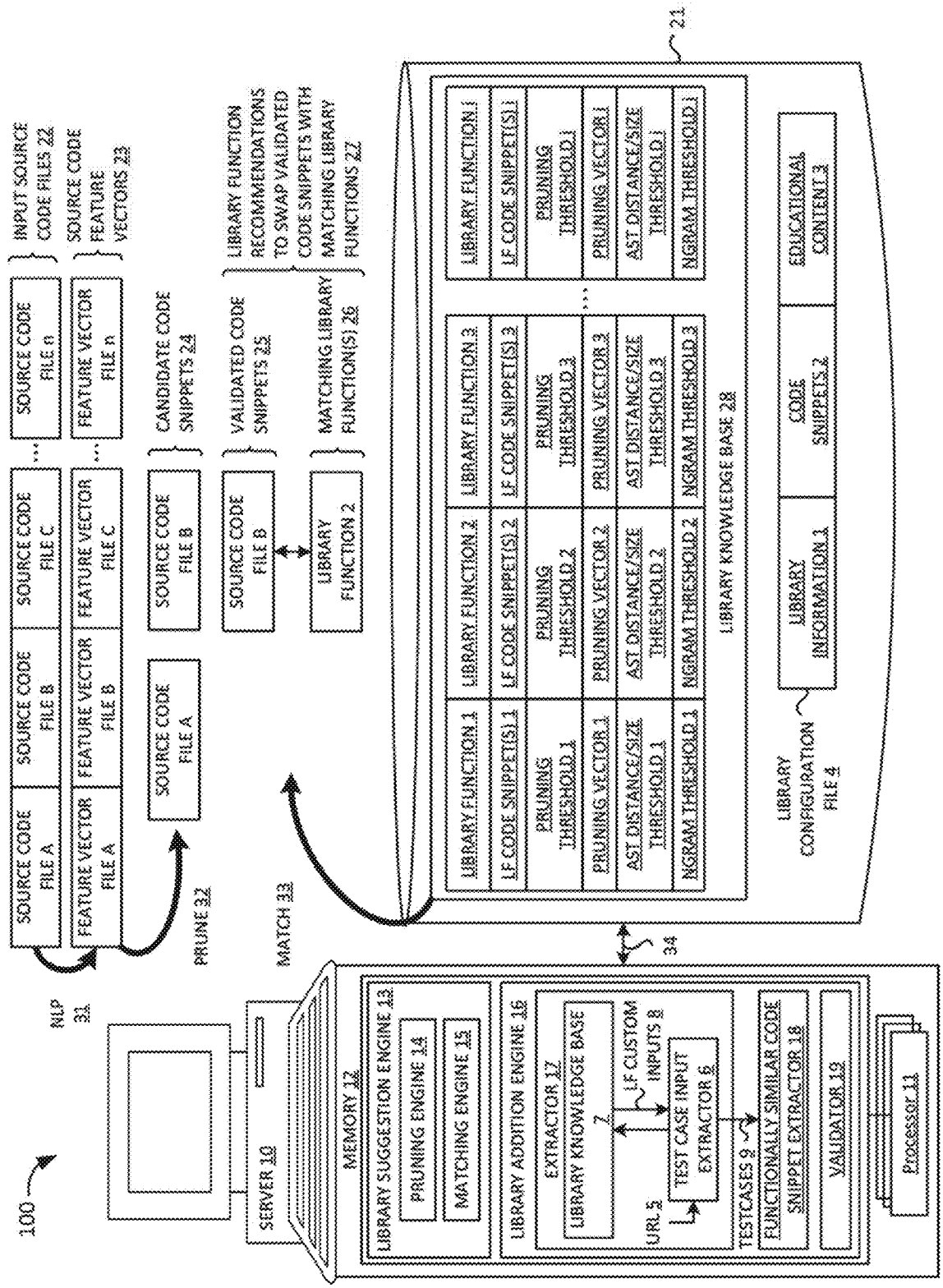
FIG. 1 is a simplified block diagram of a data processing system for adding library models to a library knowledge base which is used to generate library function recommendations in accordance with selected embodiments of the present disclosure.

Referring now to FIG. 1, a simplified block diagram illustrates an exemplary data processing system 100 for adding library models (e.g., Library Function 1) to a library knowledge base for use in generating library function recommendations with one or more server/computer systems 10 having processor(s) 11, memory 12, and associated database storage devices 21 which may be connected together over a suitable connection link 34 or network, such as a private wide area network (WAN) or the Internet (not shown). To illustrate the operative functionality of the data processing system 100, the server memory 12 may be used to store the program module functionality for the library suggestion engine 13 and library model addition engine 16. As described hereinbelow, the library suggestion engine 13 and library model addition engine 16 act upon the input source code files 22 and/or data from the database storage devices 21 to add library functions to the library knowledge base 28 and/or to generate recommendations for replacing source code written by developers with library functions stored in the knowledge base 28. The operation of the library suggestion engine 13 to transform input source code files 22 into validated code snippets 25 for matching with library functions 26 is shown with processing steps 31-33, though it will be appreciated that the underlying data may be stored in the database storage device 21 and/or memory 12.

In selected illustrative embodiments, the server/computer system 10 may include a library suggestion engine 13 that is embodied as a Question Answering (QA) system to use NLP, machine learning, and/or artificial intelligence processing techniques which are augmented with the mechanisms of the illustrative embodiments described hereafter. In a QA system implementation, the library suggestion engine 13 may be embodied as a computer program stored in memory 12 which uses one or more processors 11 to query a structured or unstructured knowledge or information database 21 which includes a library knowledge base 28. Input source code files 22 are available from an external system and/or may be stored in memory 12 and/or in the database storage device 21. Illustrated as being stored in memory 12, the library suggestion engine 13 may be configured to assess input source code files 22 against a library knowledge base 28 for purposes of suggestion library functions as replacement for one or more lines of code from the input source code files. The configuring of the library suggestion engine 13 may include providing application specific hardware, firmware, or the like to facilitate the performance of the operations and generation of the outputs described herein with regard to the illustrative embodiments. In addition or in the alternative, the configuring of the library suggestion engine 13 may include storing software applications in one or more storage devices and loaded into memory of a computing device, such as server 10, for causing one or more hardware processors (e.g., 11) of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

The library suggestion engine 13 may evaluate the input source code files to reduce or prune the number of potential candidate source code snippets for library suggestion by applying natural language processing (NLP) techniques 31 to reduce the processing burden for making library function recommendations. To this end, the library suggestion engine 13 may be provided with a pruning engine 14 for analyzing the input source code files 22 (e.g., Source Code File A, Source Code File B, Source Code File C, ... Source Code File n) using any suitable technique to identify candidate code snippets 24 (e.g., Source Code File A and Source Code File B) and remove others which are not likely candidates for library function substitution (e.g., Source Code File C and Source Code File n).

As a preliminary step in identifying the candidate code snippets 24, the pruning engine 14 may apply NLP techniques 31 to generate source code feature vectors 23 by checking for the presence of predetermined words in the input source code files 22 and assigning a corresponding weight. For example, the pruning engine 14 may be configured to apply suitable NLP techniques 31 to make the source code feature vectors 23, including but not limited to a tokenization step (which breaks each source code file into words, phrases, symbols and other elements known as tokens), a lowercasing step (which normalizes the source code files by lowercasing them), a stopwords removal step (which removes grammatical words, known as stopwords, and java-specific words from the source code files), a full form conversion step (which converts short form words, such as str or inp, in the source code file to full form, such as string or input), a semantic sense addition step (which adds contextual or semantic information to key words in the source code file, such as adding "loop$" if the keyword is in loop or adding "condition$" if the keyword is inside a conditional statement), a stemming step (which reduces words in the source code file to their root form by removing inflectional word endings), a splitting step (which converts combined words into separate words), and/or a similar sense detection step (which uses Wordnet to add similar words, such as synonyms, to the words in the source code file). In selected embodiments, the pruning engine 14 may also be configured to use an NLP or machine learning process which applies a topical model, such as a Latent Dirichlet Allocation (LDA) module or Latent Semantic Analysis (LSA) module, to extract topics in the input source code files 22. In addition, the pruning engine 14 may be configured to use a term frequency-inverse document frequency (TF-IDF) module to identify important keywords in the input source code files 22. Once the important keywords or topics from the input source code files are identified with the LDA, LSA, and/or TF-IDF algorithms, the pruning engine 14 may be configured to combine the results into net result source code feature vectors 23, such as by using a dot product of the priority of each keyword with their priority value found from LSI, LDA, and TF-IDF algorithms, respectively.

Once the source code feature vector files 23 are generated, the pruning engine 14 may be further configured to identify candidate code snippets 24 by applying pruning process 32 to identify candidate code snippets 24 from the input source code files 22 that are likely candidates for library function substitution opportunities. For example, the pruning engine 14 may be configured with a heuristic engine or module which computes a (one time) pruning threshold (e.g., Pruning Threshold 1) for each library function (e.g., Library Function 1) from the library function code snippets (e.g., LF Code Snippet(s) 1) which perform the same or essentially the same function as the library function. In selected embodiments, the pruning threshold may be calculated as the minimum of the dot product of vector achieved from the library function code snippets from permutation of the library knowledge base 28. This pruning threshold and the average vector may then be used to categorize whether a source code file should be further analyzed as a candidate code snippet 24.

To provide additional details for an improved understanding of selected embodiments of the present disclosure for pruning input source code files, the following use case scenario is provided for analyzing two input source code files 22, namely Source Code File A=a.java and Source Code File B=b.java. In this example, the first input source code file, a.java, is set forth below:

---
a.java

```
package example;
class a{
    public static void main(String args[ ]){
        int b;
        String a = "hello";
        b(a);
        System.out.println(a);
    }
}
```
---

In addition, the second input source code file, b.java, is set forth below:

```
b.java:

package example;
import java.io.*;
import java.io.BufferedReader;
class b {
    public static String readFile(String file) throws IOException {
        /* This function is used for reading a file to string
        */
        BufferedReader br;
        br = new BufferedReader(new FileReader(file));
        StringBuilder sb = new StringBuilder( );
        while(br.ready( )){
            sb.append(br.readLine( ));
            sb.append('\n');
        }
        br.close( );
        return sb.toString( );
    }
}
```

Continuing with this example use case scenario, the NLP processing 31 of the input source files 22 performed by the pruning engine 14 would be used to generate a feature vector consisting of a string of identified keywords or topics, each having an associated or computed weighting factor. For example, a source code feature vector 23 (e.g., Feature Vector File B) for the input source code file 22 (e.g., Source Code File B) would be generated from the sample source code b.java as the following vector structure:

```
['loop$readi', 0.3247174394233218], ['tostr', 0.3903609231317347],
['loop$append', 0.4470159023826545] ['loop$readlin', 0.4609584097830426],
['builder', 0.5936101105253638], ['readlin', 0.6050065274587427], ['file'.
0.6998090230209926], ['stringbuild', 0.7123321326304367], ['append',
0.7481612762292236], ['loop$line', 0.8873805425301969], ['read',
0.9581944056457393], ['bufferedread', 1.659810014435204], ['line',
1.6774363021832421], ['buffer', 1.705919490241575]
```

Using the source code feature vectors 23, each corresponding source code file 22 is evaluated against the different library functions (e.g., Library Functions 1-i) stored in the library knowledge base 28. To this end, each library function (e.g., Library Function 2) stores basic information about library function, an associated library function code snippet (e.g., LF Code Snippet 2), a pruning threshold value (e.g., Pruning Threshold 2), a pruning vector (e.g., Pruning Vector 2) specifying a feature vector for the library function, along with additional matching parameters described more fully hereinbelow, such as distance and size threshold values and an Ngram threshold value.

As disclosed herein, the basic library function information for Library Function 2 may include the signature for the library function, a link where the library code is hosted (e.g., github link), the documentation link, educational content, etc. In addition, an example LF code snippet 2 which perform same work as Library Function 2 for Apache Commons® IOUtils to string function can be:

```
public static String lib_readFile12(InputStreamReader is) throws
IOException {
    StringBuilder s = new StringBuilder( );
    BufferedReader br = new BufferedReader(is);
    while (br.ready( )) {
        s.append(br.readLine( )+"\n");
    }
    String s2 = s.toString( );
    br.close( );
    return s2;
}
```

"Apache Commons" is a registered trademark of The Apache Software Foundation.

In addition, an example pruning threshold value (e.g., Pruning Threshold 2) and pruning vector (e.g., Pruning Vector 2) for Library Function 2 may be stored in the library knowledge base 28 with the following vector structure:

```
'apache.commons.io.IOUtils.toString': [0.26090225563909775, [[['ngramsi',
0.0392156862745098], ['array', 0.05084745762711865], ['add',
0.05084745762711865], ['outstream', 0.05172413793103448],
['method$loop$reader', 0.05298245614035088], ['method$loop$readlin',
0.05298245614035088], ['method$loop$read', 0.05298245614035088],
['file_nam', 0.057167356450603515], ['sock', 0.0603448275862069], ['data',
0.06707317073170732], ['arraylist', 0.06779661016949153], ['loop$file',
0.06936247840182302], ['hasnextlin', 0.07407407407407407],
['loop$nextlin', 0.07407407407407407], ['loop$hasnextlin',
0.07407407407407407], ['nextlin', 0.07407407407407407], ['loop$reader',
0.09126873586033678], ['method$loop$append', 0.10596491228070176],
['fileinputstream', 0.11433471290120703], ['list', 0.11864406779661017],
['fileread', 0.15390307066222714], ['method$loop$line',
0.15894736842105261], ['inputstreamread', 0.2571415633386791], ['scanner',
0.25925925925925924], ['input', 0.31993278485297943], ['readi',
0.3247174394233218], ['loop$readi', 0.3247174394233218], ['stream',
0.3544155434736691], ['tostr', 0.3903609231317347], ['loop$append',
0.4470159023826545], ['stringbuff', 0.4587506367647674], ['loop$readlin',
0.4609584097830426], ['loop$read', 0.5219340195391402], ['builder',
0.5936101105253638], ['readlin', 0.6050065274587427], ['file',
0.6998090230209926], ['stringbuild', 0.7123321326304367], ['append',
0.7481612762292236], ['loop$line', 0.8873805425301969], ['read',
0.9581944056457393], ['bufferedread', 1.659810014435204], ['line',
1.6774363021832421], ['buffer', 1.705919490241575], ['reader',
2.164677513480203]]]]
```

In this example vector structure, the first term is the pruning threshold (e.g., Pruning Threshold 2=0.26090225563909775), and the remaining vector structure includes a sequence of feature vectors where the first term is a key word or topic from the library function code snippet, and the second term is the strength or weighting factor assigned to the first term. Stated more generally, the pruning vector for a given library function may be represented as: {pruning_threshold, [[keyword_to_search, strength_of_the_keyword_in_given_context]]}.

Similar to the NLP vector processing 31 described above, a unique pruning vector (e.g., Pruning Vector 1-$i$) for each library function (e.g., Library Functions 1-i) may be generated by applying NLP techniques to identify predetermined words from the corresponding library function/LF code snippet and assign a corresponding weight. Example feature vector algorithms include tokenization steps, lowercasing steps, stopword removal steps, full form conversion steps, semantic sense addition steps, stemming steps, splitting steps, similar sense detection steps, LDA processing steps, LSA processing steps, and/or TF-IDF processing steps.

Continuing with this example use case scenario, the pruning engine 14 may be configured to reduce or filter the input source code files 22 down to a smaller set of candidate code snippets 24 with a pruning process 32 that evaluates the source code feature vectors 23 against library function information in the library knowledge base 28. In the pruning process 32, each source code feature vector 23 may be compared for similarity to the pruning vectors in each library function using a similarity threshold value. For example, the input source code feature vector (e.g., Feature Vector File B) generated from an sample input source code file (e.g., Source Code File B=b.java) may be compared with each of the library function pruning vectors (e.g., Pruning Vectors 1-i) to determine if the sample input source code file (e.g., Source Code File B=b.java) qualifies as a candidate code snippet 24. With these feature vector examples of this use case scenario, the pruning process 32 is applied by the pruning engine 14 to identify Source Code File B=b.java as a candidate code snippet by evaluating Feature Vector File B against the pruning vector (e.g., Pruning Vector 2) for the Library Function 2="apache.commons.io.IOUtils.toString" stored in the library knowledge base 28. This evaluation may be performed as a dot product computation of common terms from Feature Vector File B and Pruning Vector 2 by multiplying the weights for the common terms and summing the results to determine if the resulting value exceeds the pruning threshold (e.g., Pruning Threshold 2=0.26090225563909775). In this case, the dot production computation value is 13.1299337163802074136 and exceeds the value for the Pruning Threshold 2, indicating that the corresponding input source code file (e.g., Source Code File B) qualifies as a candidate code snippet 24. However, if the dot product computation from Feature Vector File C and the library function pruning vectors does not exceed the any of the pruning threshold values for the Library Functions 1-$i$, then the corresponding input source code file (e.g., Source Code File c) does not qualify as a candidate code snippet 24.

Once the candidate code snippets 24 are identified, the library suggestion engine 13 may read and analyze the candidate code snippets 24 by applying NLP matching techniques 33 to extract features from the candidate code snippets 24 for comparison matching with features extracted from a given library function. To this end, the library suggestion engine 13 may be provided with a matching engine 15 for identifying validated code snippets 25 from the input source code which match with library functions in the library knowledge base 28. In selected embodiments, the matching engine 15 may employ a white box matching (WBM) module to perform fuzzy or internal match processing 33 which reads and analyzes the candidate code snippets 24 to extract predetermined features for matching with the features extracted from a given library function, thereby generating validated code snippets 25 (e.g., from Source Code File B) which can be replaced by a matching library function 26 (e.g., from Library Function 2). In addition or in the alternative, the matching engine 15 may employ a black box matching (BBM) module to perform input/output matching which injects shared inputs to candidate code snippets 24 and library function code snippets to detect matching outputs, thereby generating validated code snippets 25 (e.g., from Source Code File B) which can be replaced by a matching library function 26 (e.g., from Library Function 2).

Once the matching library functions 26 are identified, the library suggestion engine 13 may present library function recommendations 27 to the program developer with suggestions for swapping the validated code snippets 25 with the matching library functions 26. In selected embodiments, a library function recommendation 27 may include the validated source code snippets from the input source code files (e.g., Source Code File B) along with a visual indication that suggests a library function (e.g., Library Function 2) for replacement or substitution. For example, a first user interface display screen may show an input source code file (e.g., Source Code File B) with the validated code snippet 25 highlighted or otherwise visually set off from the remaining lines of code in the input source code file, such as by including a user interaction link which opens a second user interface display screen to show information relating to the matching library function 26 (e.g., Library Function 2).

In selected illustrative embodiments, the library model addition engine 16 may also be embodied in the server/computer system 10 as a QA system to use NLP, machine learning, and/or artificial intelligence processing techniques which are augmented with the mechanisms of the illustrative embodiments described herein. In a QA system implementation, the library model addition engine 16 may be embodied as a computer program stored in memory 12 which uses one or more processors 11 to query a structured or unstructured knowledge or information database 21 which includes a library knowledge base 28. The configuring of the library model addition engine 16 may include providing application specific hardware, firmware, or the like to facilitate the performance of the operations and generation of the outputs described herein with regard to the illustrative embodiments. In addition or in the alternative, the configuring of the library model addition engine 16 may include storing software applications in one or more storage devices and loaded into memory of a computing device, such as server 10, for causing one or more hardware processors (e.g., 11) of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

However configured, the library model addition engine 16 is connected to receive program inputs, including information describing each library function or model 1, functionally similar code snippets 2, and education content 3, are available from an external system and/or may be stored in memory 12 and/or in the database storage device 21. Illustrated as being stored in memory 12, the library model addition engine 16 may be configured onboard a library model with a user interface input screen to enter the library information 1, code snippets 2, and education content 3 as a library configuration file 4 using a YAML-based file format. Each library configuration file 4 represents the data needed to recognize a single function in the library knowledge base 28, and should not include multiple function configurations. In selected embodiments, the library configuration file 4 may be automatically generated into a human-readable format which is parsable by software (e.g., YAML) by using an extractor 17 to extract, scrape, or otherwise construct the library configuration file 4 by populating the following sections:

Name of the library (e.g., library_name),
Name of the library function (e.g., library_function_name),
Library Descriptors which mention the property of a particular library function,
Online link to the documentation page for the library function (e.g., documentation_link), logo image link (e.g., logo_image_link), library code link (e.g., library_code_link), and/or maven link (e.g., maven_link),
Method signature (e.g., signature),
One or more custom inputs (e.g., custom_inputs) that can be passed to the library functions,
Transform functions for converting complex type to simple type,
A list of conditions (e.g., equal_function_True) that will determine a valid match when the expression evaluates to True,
A list of conditions (e.g., equal_function_False) that will determine a valid match when the expression evaluates to False, and
One or more functionally similar code snippets (e.g., code_snippets) that will help establish a pattern for the code.

In accordance with selected embodiments of the present disclosure, the extractor 17 may include program code and/or modules 5-8 for use in automatically generating test cases 9. As depicted, the extractor 17 may be coupled to retrieve the library model source code 5 from the online URL link to the documentation page which may be extracted from the library configuration file. The library model source code 5 is then scraped using the text case input extractor 6 which identifies test files using a plurality of test file parameters. In selected embodiments, the text case input extractor 6 checks for files with a "test" keyword parameter in the absolute path name of the file, and may also check if a particular type of test library (e.g., Junit) is used or imported in the test file. While these parameters provide good performance in detecting whether a file includes test cases or not, it will be appreciated that other test file parameters may be used. Whichever test file parameters are used, the text case input extractor 6 may be configured to scrape the pruned test files to extract test case input parameters which are passed to auto-generated code which calls the library knowledge base 7 with the jar and then generates test case outputs 9 corresponding to the extracted library function custom inputs 8 retrieved from the library knowledge base 7. By automating this approach to identify test cases present in the documentation, the developer is relieved from the burden of searching for test cases and more reliable test cases can be identified for inclusion in the library configuration file 4.

As illustrated, the test case outputs 9 may be provided as inputs to the code snippet extractor 18 which extracts functionally similar code snippets using any suitable code snippet generation technique. For example, the test case outputs 9 may be provided as inputs to a blackbox matching engine which performs input/output matching to inject the test cases 9 into codes stored at a repository of open source code bases. As a result, the extractor 18 can automatically identify functionally similar code snippets as the sample code snippets 2 in the library configuration file 4 for the candidate library model. With this approach, the developer is relieved from the burden of searching for code bases and identifying promising code snippets that can be used for internal or fuzzy matching evaluation of candidate library models.

The library model addition engine 16 may also be configured with a validator 19 for evaluating a submitted input library configuration file 4 to ensure that the file is in the correct format and satisfies the constraints provided by the library recommendation engine. In selected embodiments, a YAML validator 19 may be implemented as a python package which validates whether the content of YAML configuration file is correct or not. One part of the validator package may include a YAML format validator to check the YAML format and fields for correctness and validity, to confirm that the identified links are working links, to check that a minimum number of code snippets are included. Another part of the validator package may be a fuzzy/internal matching engine validator which checks the validity of code snippets in terms of compilability of each code snippet. Yet another part of the validator package may be an input/output matching engine validator which checks the validity of transform functions and custom inputs against the method signature. If the transform function is not compilable or not in accordance with the method signature, the validator 19 identifies the library configuration file as faulty. In addition, the validator 19 may check if the custom inputs provided are correct (i.e., they satisfy the method signature). In addition, the validator 19 may check that a given JAR for a library function will generate outputs with respect to the given set of custom inputs. Using the validator 19, developers are able to smoothly generate and test the library models locally on their system. This has made their life a lot easier than before and this provides luxury for checking the library models locally on their system.

As will be appreciated, once the server/computer system 10 is configured to implement the library suggestion engine 13 and/or library model addition engine 16, the server/computer system 10 becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates the addition of library functions to a library knowledge base 28 and/or the generation of library function recommendations for a program developer by pruning input source code 22 into candidate code snippets 24 which are then matched as validated code snippets 25 with corresponding library functions 26 based on a measure of fuzzy and/or input/output matching similarity for presentation to the program developer as library function recommendations 27.

Figure 2:
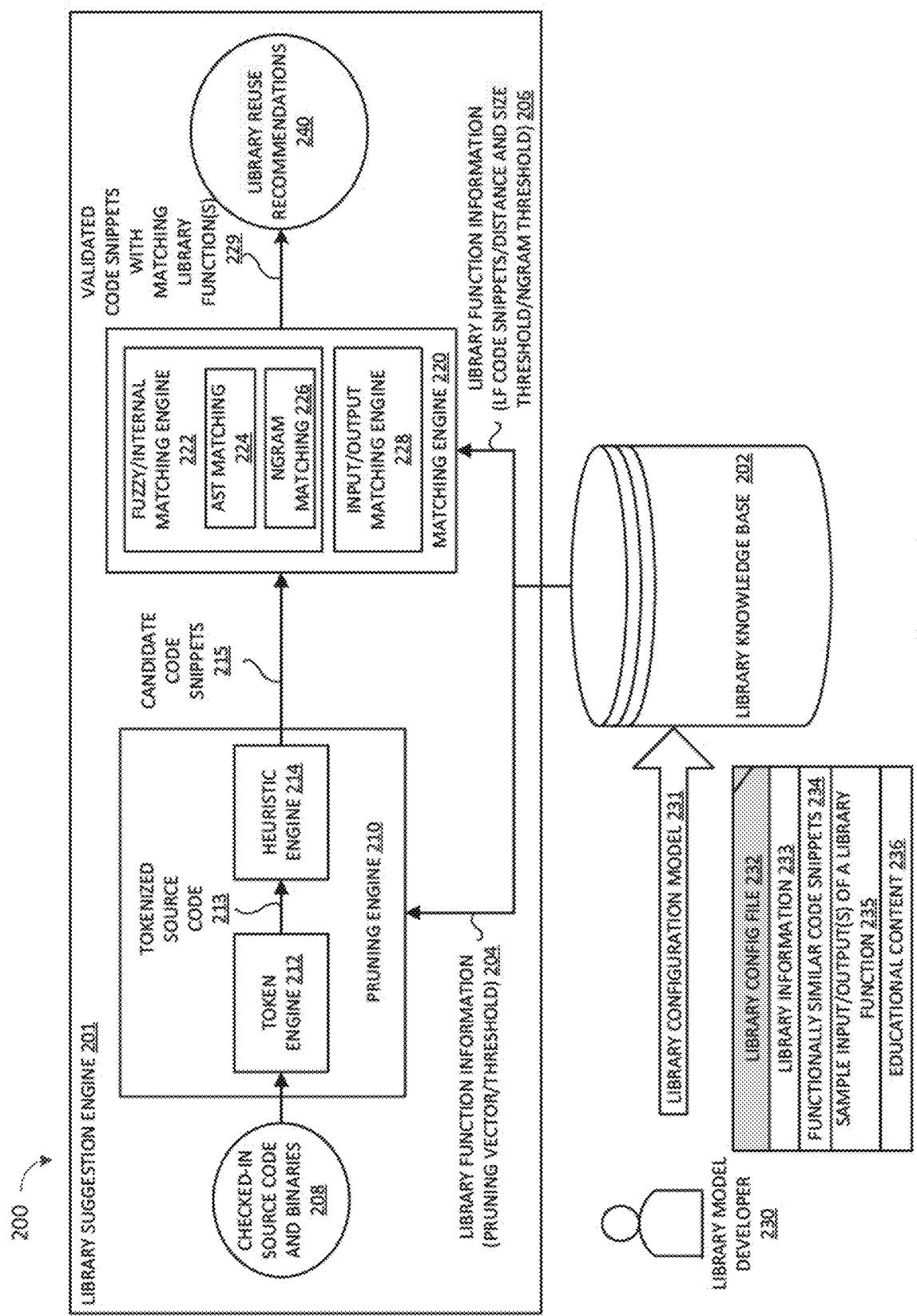
FIG. 2 illustrates a library model addition workflow for use in generating library reuse recommendations in accordance selected embodiments of the present disclosure.

To provide a contextual understanding for selected embodiments of the present disclosure, reference is now made to FIG. 2 which illustrates a workflow 200 for generating library reuse recommendations 240 from input source code and binaries 208 in accordance selected embodiments of the present disclosure. In selected embodiments, the depicted workflow 200 may be implemented in whole or in part with a data processing system (such as shown in FIG. 1) and/or a single integrated circuit (e.g., a system-on-chip) or a plurality of integrated circuits to implement one or more processors with local memory and database storage that are interconnected and interoperate using any suitable techniques without departing from the present invention.

However implemented, the workflow 200 receives input code (block 208) which may be checked into the system as source code and binary files created by the program developer. An additional input to the work flow 200 is the library function information 204 provided by the library knowledge base 202 which stores library function information, code snippets which perform the same work as a library function, pruning threshold and pruning vector information, distance and size threshold information, and Ngram threshold information. To manage and curate the library function information 204 in the library knowledge base 202, the library model developer 230 may submit configuration files 232 which represent the data needed to recognize each library function in the library. For example a configuration file for a single library function may include the name of the library (e.g., library_name), the name of the library function (e.g., library_function_name), library descriptors information (e.g., information specifying the property of a particular library function), an http url link to the documentation (e.g, documentation_link), a method signature (e.g., signature), one or more custom inputs that can be passed to the library functions, one or more transform functions for converting complex type to simple type, a list of conditions that will determine a valid match when the expression evaluates to True (e.g., equal_function_True), a list of conditions that will determine a valid match when the expression evaluates to False (e.g., equal_function_False), and or more code snippets that will help establish a pattern for the code (e.g., code_snippets). In this way, the library knowledge base 202 has only the best of library functions, and can also support customized library code for customer needs so that they can import their particular library usage within their organization.

Upon check-in to the workflow 200, the input code is pruned or parsed by the pruning engine 210 to identify candidate code snippets for library suggestion opportunities. While any suitable pruning approach may be used, selected embodiments may employ a tokenization engine 212 which uses NLP processing to break the input code into tokens 213 (e.g., tokenized source code) which are passed to the heuristic engine 214. The heuristic engine 214 is also connected to receive library function information 204 from the library knowledge base 202 which stores data that may be curated and standardized according to frequency in terms of usage, number of issues, commits, contributions, and various other factors. In selected embodiments, the heuristic engine 214 pools the tokens into candidate code snippets 215 using various techniques, such as polygraph, latency, and indexing, LDA, etc. The resulting candidate code snippets 215 are then passed to a matching engine 220 which is in turn composed of two different engines—a fuzzy or internal matching engine 222 and an input/output matching engine 228.

Fuzzy/Internal or White Box Matching

At the fuzzy/internal matching engine 222 (also referred to as a "white box matching" engine), each received candidate code snippet 215 is processed for matching with library feature vectors from the library function information 206 based on their structural and execution flow similarity. To this end, the fuzzy/internal matching engine 222 may be provided with an Abstract Syntax Tree (AST) matching algorithm 224 for identifying validated code snippets from the input source code which match with library functions in the library knowledge base 202. In selected embodiments, the AST matching algorithm 224 may employ a syntax tree to represent the abstract syntactic structure of the candidate code snippets 215 and library function code snippets 206 from the library knowledge base 202 that are written in a source code programming language. Each node of the tree denotes a construct occurring in the source code. In addition, the syntax is "abstract" in not representing every detail appearing in the real syntax. For instance, grouping parentheses are implicit in the tree structure, and a syntactic construct like an if-condition-then expression may be denoted by means of a single node with three branches. In selected embodiments, the AST matching algorithm 224 may be embodied with the Clone Digger duplicate code detection tool which performs anti-unification analysis of the AST of the library function code snippets 206 and the candidate code snippets 215 being validated. In operation, the AST matching algorithm 224 constructs an abstract syntax tree (AST) for each code snippet being analyzed in any desired source code language, such as Python® programming language, Java® programming language, and other programming languages, such as Java 8. ("Java" is a registered trademark of the Oracle Corporation.) For example, the AST matching algorithm 224 may be implemented by creating a wrapper on top of Clone Digger to extend the AST matching for Java 8 code snippets with improved accuracy and efficiency.

For improved accuracy for of the AST matching algorithm 224, the AST size threshold and distance threshold values may be adjusted or tweaked for each different library function, and then stored while onboarding any new library function in the library knowledge base 202 for automated usage. As will be appreciated, the AST size threshold value specifies the minimum size of the nodes in each abstract syntax tree, while the AST distance threshold values specifies the maximum distance which is allowed for two ASTs to qualify as matching. In accordance with the present disclosure, the AST distance threshold value for each library function may be calculated from the library function code snippets in the library knowledge base 202 which are permuted and applied to the Clone Digger anti-unification algorithm. In addition, the AST size threshold value may be calculated as the minimum number of nodes in the library knowledge base 202 multiplied by a constant factor which is less than 1. The Clone Digger tool used to implement the AST matching algorithm 224 may also be modified to allow changes to the variable name and function name parameters and/or to remove the report generation feature.

Continuing with an example use case scenario to illustrate how the fuzzy or internal matching engine 222 compares features from a candidate code snippet 215 and library function code snippet 206, the AST matching algorithm 224 is used to construct an AST for each candidate code snippet 215 and library function code snippet 206 and then apply a clustering algorithm to find similar code snippets, such as by using the ant-unification algorithm from the Clone Digger implementation of the AST matching algorithm 224. In addition, Ngram matching algorithm 226 is used to break the candidate code snippet (e.g., Source Code File B=b.java) into class and then into system level instructions as set forth below:

```
indexOf:(Ljava/lang/String;)I    ShowWeekdayR.main:([Ljava/lang/String;)V,15 0
indexOf:(Ljava/lang/String;)I    ShowWeekdayR.main:([Ljava/lang/String;)V,38 0
indexOf:(Ljava/lang/String;)I    ShowWeekdayR.main:([Ljava/lang/String;)V,61 0
split:(Ljava/lang/String;)[Ljava/lang/String;
     ShowWeekdayR.main:([Ljava/lang/String;)V,72 0
java/lang/Integer.parseInt:(Ljava/lang/String;)I
     ShowWeekdayR.main:([Ljava/lang/String;)V,80 0
java/lang/Integer.parseInt:(Ljava/lang/String;)I
     ShowWeekdayR.main:([Ljava/lang/String;)V,86 0
```

After converting both the library function code snippets and the candidate code snippets being analyzed, the fuzzy/internal matching engine 222 finds the similar code snippets at function level.

To provide additional match processing, the fuzzy/internal matching engine 222 may also be provided with an Ngram matching algorithm 226 for identifying validated code snippets from the input source code which match with library functions in the library knowledge base 202. In selected embodiments, the Ngram matching algorithm 226 may employ a contiguous sequence of n items formed from the ASM files which in turn are extracted from Class files to represent the internal structure of the candidate code snippets 215 and library function code snippets 206 from the library knowledge base 202 that are written in a source code programming language. In operation, the Ngram matching algorithm 226 extracts n-grams from a given candidate code snippet 215 for comparison with the Ngrams extracted from library function code snippets 206 from the library knowledge base 202. In selected embodiments, the Ngram matching algorithm 226 may be embodied with the Agec execution-semantic clone detection tool which analyzes the library function code snippets 206 and the candidate code snippets 215 being validated. In operation, the Ngram matching algorithm 226 applies an abstract interpretation to bytecode as a static analysis in order to generate n-grams from the candidate code snippets 215, detects the same n-grams from distinct places of the library function code snippets 206, and then reports these n-grams as code clones.

For improved accuracy for of the Ngram matching algorithm 226, the Ngram threshold value may be adjusted or tweaked for each different library function, and then stored while onboarding any new library function in the library knowledge base 202 for automated usage. As will be appreciated, the Ngram threshold value specifies the minimum number of Ngrams which need to be matched in order for the candidate code snippet to be validated. In accordance with the present disclosure, the Ngram threshold value for each library function may be calculated by finding the minimum of maximum number of Ngrams present in the library knowledge base 202. In addition, the Agec clone detection embodiment of the Ngram matching algorithm 226 may be modified to provide ASM-level operators and/or to add literals and parent function features for similar code detection. In other embodiments, the Agec clone detection tool used to implement the Ngram matching algorithm 226 may also be extended to work with input data types (such as array, Integer, String, etc.), to allow for multiple function invocations within the same file, and/or to auto generate custom inputs by extracting test cases from the library function test cases.

In selected embodiments, the AST matching algorithm 224 and Ngram matching algorithm 226 may be further modified for improved accuracy by adding a literal or constant Ngram to require a strict matching algorithm in cases where the literal constants play an important role for a code snippet to work similar to a library function. For example, when a removeExtension instruction has a literal constant of '.' which when replaced with something like '|' in the candidate code snippet be analyzed, then the matching algorithm should not yield a library substitution opportunity as removeExtension, even though most of the AST and Ngrams are similar with the library knowledge base 202.

Input/Output or Black Box Matching

In addition to performing fuzzy/internal matching, the input/output matching engine 228 (also referred to as a "black box matching" engine) is configured to inject shared inputs into the candidate code snippets 215 and the library functions via JARs which are extracted via maven links presented in the library function information 206 to see if the candidate code snippet output is similar to the library function code snippet output. Based on the output similarity, the input/output matching engine 228 assigns a similarity rating. If the outputs match, the candidate code snippet 215 being analyzed is validated for possible replacement with the matching library function.

Continuing with an example use case scenario to illustrate how the input/output matching engine 228 injects a shared input into a candidate code snippet 215 and library function code snippet 206 to compare the output results, consider the example of the following input candidate code snippet 215 being compared at the input/output matching engine 228 is set forth below:

```
--code--
if (path.indexOf("\\") == -1) {
        answer = path;
     }
answer = path1;
--code--
At the input/output matching engine 228, this input candidate code snippet
is converted to:
public java.lang.String testMethod(String testMethodInput__0; String
testMethodInput__1) throws Exception {String path = testMethodInput__0;
     if (path.indexOf("\\") == -1) {
           return path;
     }
     String returnTestMethodVar = testMethodInput__1;
        return returnTestMethodVar;
}
```

The input/output matching engine 228 may then use an interface program, such as Py4J, to pass inputs into this function, and the results are matched with corresponding library function results which are calculated by running jar with same parameters.

The main challenge for performing input/output matching is to extract the right code snippets for matching analysis. The performance of input/output matching at the function level of granularity rarely works since most of the library suggestion opportunities are hidden within code segments that are difficult to recognize. To address this limitation, the input/output matching engine 228 may be configured to check each and every code snippet line by treating them as start and end lines. While doing this, the code snippet AST is analyzed to maintain a symbol table. Based on the input parameters to the input/output matching engine 228 and the return type of the library function being analyzed for suggestion, validated code snippets 229 may be extracted. To this end, the input/output matching engine 228 extracts all the basic imports used in the candidate code snippet 215 being analyzed and the candidate code snippet is templatized by forming appropriate class with function definition. Next, the candidate code snippet is checked to see if it is compilable. If the candidate code snippet is compilable, a predetermined set of inputs is injected into the candidate code snippet and the resulting output is checked to see if they are similar or identical to the outputs from the library function.

By combining the outputs from the fuzzy/internal matching engine 222 and input/output matching engine 228, the matching engine 220 identifies validated code snippets with matching library functions 229 which are output as library reuse recommendations 240.

Presenting Library Function Recommendations

The results of the match processing by the matching engine 220 are presented to the programmer as one or more library function recommendations which may include code lines from input source code files (e.g., validated code snippets) along with code lines from the recommended library function. To assist the developer with the recommended library substitution, the developer may also be provided with additional library function information identifying the code improvement recommendation and/or code reduction resulting from the library function recommendation and/or educational tutorial information relating to the implementation of the library function recommendation.

Adding Library Functions to the Library Knowledge Base

To support the addition of new library functions to the accumulated library knowledge base, the workflow 200 is configure to receive and validate a library configuration file 232 created by the program developer 230 when adding a library configuration model 231 to the library knowledge base 202. Generally speaking, the library configuration file 232 includes library function information 233, functionally similar code snippets 234 which perform the same work as the library function, sample inputs and outputs for the library function 235, and educational content 236. For example a library configuration file 232 may be formatted as a YAML format file to describe a single candidate library function in terms of a library name (e.g., library_name), library function name (e.g., library_function_name), one or more library descriptors describing properties of the library function, a documentation link for the library function (e.g., documentation_link), a method signature (e.g., signature), one or more custom inputs that can be passed to the library functions, one or more transform functions for converting complex type to simple type, a list of conditions that will determine a valid match when the expression evaluates to True (e.g., equal_function_True), a list of conditions that will determine a valid match when the expression evaluates to False (e.g., equal_function_False), and or more code snippets that will help establish a pattern for the code (e.g., code_snippets). In this way, the library knowledge base 202 has only the best of library functions, and can also support customized library code for customer needs so that they can import their particular library usage within their organization.

Configuration File Structure

Library Name and Library Function Name

To provide additional details for an improved understanding of selected embodiments of the library configuration file 232, the following configuration file structure is provided for representing the data needed to recognize a library function. In this example, the "library name" data structure field (e.g., library_name: "org.apache.commons.io") provides a simple label that identifies the library that the function belongs to. The best practice here is to use the root package name of the library. In addition, the "Library Function Name" data structure field (e.g., library_function_name: "org.apache.commons.io.IOUtils.toString") provides a simple label to identify the function in the library that is being configured.

Library Descriptors

In addition, the disclosed configuration file structure may include a "library descriptors" data structure with fields identifying one or more optional descriptors which mention the property of a given library and are used for showing results in a proper format. In an example embodiment, the "library descriptors" data structure may include a "Type of Library Function" library descriptor (e.g., "code_type") which mentions the type of code which a given library function can replace. The "library descriptors" data structure may include an "Embedding Video Tutorial Link" library descriptor (e.g., "embed_video_link") which defines a HTTP url which is a video tutorial explaining how to replace code using this library function. In addition, a "Maven Repository Link" library descriptor (e.g., "maven_link") may be included which defines an HTTP url link for the mavenlink to the library. In similar fashion, a "Library Code Link" library descriptor (e.g., library_code_link") may define a HTTP url which is the link to the source code of the library hosted on revision control system. If desired, the "library descriptors" data structure may also include a library's "Logo Image Link" library descriptor (e.g., "logo_image_link") which defines an HTTP url which is the link to uploaded/available logo of library. The "library descriptors" data structure should also include a "Summary Of Library Function" library descriptor (e.g., "summary") which provides a one line summary to what the library function does, and a "Number Of Lines" library descriptor (e.g., "number_of_lines") which lists the number of lines of code which would be added when replaced with the function. Generally, the "Number of Lines" descriptor is set to "1" unless there is a need to initialize parameters. In addition, the "library descriptors" data structure may include a "Description" library descriptor (e.g., "description") which is a dictionary which provides a detailed description about the library by specifying the advantages and code snippet details. For example, the dictionary may have a "Code" key (e.g., "code") which contains the code snippet which shows usage of the library function. In addition, the dictionary may have a "Advantage" key (e.g., "advantage") which is an array with multiple parameters, namely "name," "rating," and "description." As their respective names signify, "name" represents the name of the advantage, "rating" (an integral value) may represent a rating value (e.g., on a 5-star rating system), and "description" may represent the reason behind giving the rating.

To provide additional details for an improved understanding of selected embodiments of the present disclosure, the following use case scenario is provided as an example of the library descriptors for the following library function:

,public static String concat(String basePath,
　　String fullFilenameToAdd)

-continued

```
where the "library descriptors" data structure is:
    code_type: "Filepath Manipulation"
    embed_video_link: "https://www.youtube.com/embed/7
doqq9zK2k"
    library_code_link: "https://github.com/apache/commons-io"
    maven_Link:
"http://mvnrepository.com/artifact/commons-io/commons-io/2.4"
    logo_image_link: "http://s20.postimg.org/4g0cz3ayh/apache.png"
    summary: "The code snippet takes input as file paths and try to join
them
    using separators."
    number_of_lines: 1
    description:
        code: "FilenameUtils.concat(base_path, path_to_join)"
        advantages:
            - name: "Maintainability"
              rating: 3
              description: "Code is less complex, clearer and easy to understand
since
Apache Commons FilenameUtils is a popular library.Hence the code
becomes
more maintainable"
            - name: "Robustness"
              rating: 4
              description: "Apache Foundation is a very active community and
hence the
chances of bugs in the library code is less and the fixes are frequent
making the code robust"
            - name: "Documentation"
              rating: 3
              description: "There is complete and ample documentation given for
Apache
Commons FilenameUtils Library"
            - name: "Test Coverage"
              rating: 3
              description: "Apache Commons FilenameUtils has a
comprehensive set of
developer tests, providing assurance of the library quality"
            - name: "Maturity"
              rating: 3
              description: "The library has been under active development since
2002.
It is a mature and reliable code base"
```

Documentation Link

In addition, the disclosed configuration file structure may include a "Documentation Link" data structure (e.g., documentation_link: "https://commons.apache.org/proper/commons-io/apidocs/org/apache/commons/io/IOUtils.html#toString(iava.io.Reader)") with fields specifying the online url link for the documentation page of the library function (not the full library).

Method Signature

The disclosed configuration file structure may also include a "method signature" data structure which specifies the signature for the library function. In selected embodiments, the "method signature" data structure may include a "method parameter types" part (which defines the type for the method input parameter) and a "method return type" part (which defines the return type of the method call), both of which are Java objects. All the types should be having their fully-qualified names. To provide an improved understanding of selected embodiments of the "method signature" data structure, reference is now made to a first example single parameter method signature:

```
public static String toString(Reader input)
    throws IOException
``` where the corresponding configuration for the method signature would be:

```
signature:
    method_parameter_types:
        - java.io.Reader    // Type of the input parameter
    return_type:
        - java.lang.String   // Return type of the method
```

For an additional example "method signature" data structure, reference is now made to a signature definition for a two-input method, such as StringUtils.join, having a two-parameter method signature:

```
public static String join(String[ ] array,
    char separator)
``` in which case the corresponding configuration for the method signature would be:

```
signature:
    method_parameter_types:
        - java.lang.String [ ]
        - char
    return_type:
        - java.lang.String
```

For another example "method signature" data structure, reference is now made to a signature definition for a three-input method, such as FilenameUtils.wildCardMatch, having a three-parameter method signature:

```
public static boolean wildcardMatch(String fileName, String
    wildCardMatcher, IOCase caseSensitivity)
``` in which case the corresponding configuration for the method signature would be:

```
method_parameter_types:
    - java.lang.String
    - java.lang.String
    - org.apache.commons.io.IOCase
return_type:
    - boolean
```

Custom Inputs

As disclosed herein, the configuration file structure may also include a "custom inputs" data structure which is used to provide custom inputs to the library function. In an example embodiment, the "custom inputs" data structure may include a "custom inputs" field which defines custom inputs that can be passed to the library function. The number of inputs in each instance of a custom input should be equal to the number of method_parameter_types in the signature section. In addition, the type of each input value in a custom input instance should match the corresponding type in method_parameter_types. The "custom inputs" data structure may include an "input" field which specifies each instance of a custom input.

For simple types of library functions (such as String, int, bool or their array counterparts), the "custom inputs" data structure can be written in a straightforward manner. For example, a use case scenario of custom inputs for the library function, StringUtils.join, would be the code given below.

```
custom_inputs:
    - input:            # StringUtils.join takes in two
parameters
        - ["a", "b", "c"]  # First one is an array of Strings
        - "_"              # Second one is a character
variable
    - input:            # Number and type of parameters
each input has should be equal to what the library function has
        - ["d", "e", "f"]
        - "."
```

In selected embodiments, the library configuration model 231 may be configured to support a predetermined set simple types of library functions, such as java.lang.String, java.lang.CharSequence, java.lang.String [ ], java.lang.Character, java.lang.Integer, java.lang.Integer [ ], java.lang.Boolean, int, int [ ], char, and Boolean. However, for other types of library functions apart the supported simple types, the program developer may be required to write custom inputs. For example, if the input for a library function is a complex object, or an object from a class present in an external JAR, or input types, such as InputStream, BufferedReader etc., then there is no straightforward way to express them.

In order to be able to send complex data types to custom inputs, the library configuration model 231 may be configured with transform functions that build complex types from the basic types. In such cases, the transform function may be implemented as a Java function snippet that takes in a basic type and then uses that basic type to generate the required complex type object. Each transform function may include two parts—an "import" part and a "code" part.

The "imports" part of the transform function enables the addition of the set of imports that the underlying transform functions make use of. These are the imports which are required to compile the code. The "imports" part may include a "built_in" section which includes all of the built-in imports that the transform function uses. If the transform function makes use of only these built-in or default library imports in the snippets, then the "built_in" section can be omitted. In case of the snippets using any imports apart from those present in the built-in or default library, those need to be mentioned here. The "imports" part may also include a "third party" section which allows users to add imports that are not built into Java by default. If the programmer wants to import a class or a package present in an external jar, the programmer can use this "third party" section to specify them. The "third party" section may include internal sections, such as a "mvn_link" which identifies the maven repository link for the jar and an "import_string" which identifies the classes or packages from the jar that need to be imported.

The "code" part of the transform function contains all the transform function snippets. In selected embodiments, each transform function can be put under a "function_code" section which defines each function. In this example the function's modifiers should be public static. In addition, the provided transform function should be compilable when put inside a proper class with imports mentioned above.

To provide an improved understanding of selected embodiments of a transform function, reference is now made to an example "wildCardMatch" library function of FilenameUtils which has the following signature:

```
FilenameUtils.wildcardMatch(java.lang.String, java.lang.String,
    org.apache.commons.io.IOCase).
```

In this example library function, the "org.apache.commons.io.IOCase" class is a complex object. An example usage of how custom inputs could be passed for that class is given below:

```
Custom_inputs:
    - input:
        - "abc.txt"          # The first String parameter
        - "*.txt"            # The second String parameter
        - type:["java.lang.String"]# The third parameter is
IOCase which is a complex type. So we make use of the transform
(contd.)
            input_value:["Sensitive"]# function 'getIOCase' which
takes in a String (mentioned in the 'type' section) and the (contd.)
            transform_function: getIOCase # String value it takes
in is "Sensitive" (mentioned in the 'input_value' section)
    - input:
        - "one"
        - "*.jpg"
        - type: ["java.lang.String"]
            input_value: ["Insensitive"]
            transform_function: getIOCase
transform_function_snippets:
    imports:
        built_in:            # optional
            - java.nio.*
            - java.io.*
        third_party:
            - mvn_link:
http://mvnrepository.com/artifact/commons-io/commons-io/2.4  # maven
repo link of apache commons-io jar
                import_string: 'org.apache.commons.io.IOCase'
# The class that we want to import from the jar
    code:
        - function_code: | # The transform function that takes
in a String and returns an IOCase Object
            public static IOCase getIOCase(String name)
throws IOException {
                IOCase ioCase = IOCase.forName(name);
                return ioCase;
            }
```

As seen from the foregoing example, a custom input can be specified by using a transform function to define the "type," the "input value" and the "transform function." The "type" defines the type of input that the transform function receives as an input. The types here should be mentioned as a fully qualified name similar to the signature part. Generally, these would be the simple Java types, like String, int, float, boolean, and their respective arrays. In order to specify a custom input, the transform function should also specify the actual "input value" that is passed to the parameter of the transform function in order. In selected embodiments, the "input value" can have decorators which will transform the data applied to it. For example, a "FILE" decorator that is applied over any data (e.g., "file_data") would store the data contents in a file and return a file name (e.g., "file_name"). As disclosed herein, the transform functions can then be written to take in that file name as a parameter and then try to generate complex types, assuming it has access to the file name of the file it needs to use inside its code. In selected embodiments, the data that needs to be passed to the "FILE" decorator may be defined in a separate section (e.g., file data) whereby data passed to files can be accessed like an array to get its contents. For example, a use case scenario of using a transform function to specify custom inputs would be an input value, input_value: [FILE(file_data[0])]. In this case, the final value for the "input value" would be a suing which is nothing but a file name, and that file's contents would be the data present in the zeroth index of the file_data section. This file name can then be passed to a transform function as a String and that transform function can in turn have code that makes use of that file. Finally, the "transform function" is the name of the transform function to call to get the actual input.

Continuing with this example, in order to pass in InputStream as an input to the function IOUtils.toString(java.io.InputStream), the following transform function could be used:

```
signature:
    method_parameter_types:
        - java.io.InputStream
    return_type:
        - java.lang.String
custom_inputs:
    - input:
        -    type: ["java.lang.String"]
             input_value: ["FILE(file_data[0])"]
             transform_function: getInputStream
file_data:
    - Sample data for the file
transform_function_snippets:
    code:
            - function_code: |
                public static Inputstream
getInputStream(String filename) throws IOException {
                    File file = new File(filename);
                    Inputstream is = new
FileInputStream(file);
                    return is;
                }
```

In the foregoing example, the transform function is written in to expect a filename as a String, and to create a new File object from which it creates an InputStream object. The FILE decorator may be used to implement this by using the FILE decorator (which returns a file name in the back end) to pass the file name returned from it to a transform function which can, in turn, use it however it wants. In addition, the FILE decorator has the ability to specify the contents of the file.

As reference above, the "File Data" section can be used to define data that could be used as contents of a file. These file datum can then be used while providing custom inputs as part of the FILE decorator. They can be accessed like an array. For example, file_data[0] would point to the first file data entry, file_data[1] would point to the second file data entry, and so on. The "File Data" section may be optional, but should be used whenever FILE decorator is used in order to specify the file data.

In use case of scenarios where the input type is some form of stream or reader (e.g., InputStream or BufferedReader) which is mostly generated from the contents of a file, the end user can design the transform functions in a way that the end user just passes the contents of the file and wraps it with the decorator FILE (which means that the engine should generate a filename with the contents of the file being the contents enclosed in the FILE decorator). The transform function in turn can be modelled to take in a fileName String and then write his own snippet to transform that to an InputStream or Reader, etc.

As disclosed herein, a good custom input set will have a number of properties. First, the custom inputs should try to cover all kind of scenarios. Second, the custom inputs should cover edge cases. Third, in case of a boolean output, the number of inputs yielding True results should be equal to the number of inputs yielding False results. Fourth, all custom inputs should be unique. Fifth, there should be more than five custom inputs.

"Equals True" and "Equals False" Conditions

As disclosed herein, the disclosed configuration file structure may also include "equals true" and "equals false" conditions data structures with fields identifying one or more conditions that, when evaluating to True and False, respectively, will be used to match the output generated by code snippet and the expected output. These specified conditions are specific to data type which being matched. In an example embodiment, an "AND" condition is specified with commas in the list, while an "OR" condition is specifically mentioned in the list. In addition, the default condition is considered as false. These conditions are Python boolean commands.

Code Snippets

The disclosed configuration file structure may also include code snippet data structures which store Java code snippets which are used by the fuzzy/internal matching engine to find patterns when matching source code with candidate library function substitutions. Each stored code snippet should be compilable when put inside a proper class. In accordance with selected embodiments disclosed herein, each code snippet data structure may have a mandatory "code" part and an optional "imports" part. The "code" section contains the function snippets which perform similar tasks as that of the library. In selected embodiments, the "code" section has a "function_code" section where each function can be defined. In this example, the function's modifiers should be public static. The "imports" section identifies the imports which are required to compile the code. In selected embodiments, a list of default Java library imports may be supported and stored for retrieval and access. For example, if the proposed library function uses any of the default imports (e.g., Java IO Library, Java Util Library, Java Math Library, or Java Net Library), then there is no need to specify them in the imports section of the code snippet.

Since the logic of a proposed library function can be represented as a code snippet in an infinite number of ways, some rules should be followed to prepare an optimal number of well-written code snippets and variations thereof needed to submit for use by the library suggestion engine. When evaluating the quality of code snippets, a structural similarity concept should be considered which compares the abstract syntax tree similarity of code snippets. In addition, a logic similarity or variation concept should be considered which compares the code snippets to determine if they are different from each other in terms of logic and implementation.

As disclosed herein, a good set of code snippets will have a number of properties. First, each code snippet should be compilable (with proper class definition and imports). Second, any Variable and Method Names should be relevant to the context so as to refrain from using variables (e.g., "i", "foo", "bar", etc.) and instead use the camelcase java convention (e.g., "filename", "fileContents", etc.). In addition, the writer should use variable names that a developer would while using the library functions. Third, each code snippet should do only what the proposed library function does, so that there is no additional pre- or post-processing. To achieve this, the writer should avoid null checks, print statements, and any other such statements that do not have any impact on the core logic of the function. Fourth, each code snippet should be structurally different from the other code snippets. In meeting this requirement, the variables should not be renamed when creating a new code snippet, and re-ordering of statements wherever possible should be included. Fifth, there should be, for each variation of logic, at least two structurally different code snippets provided. Sixth, all possible logic variations should be incorporated in the code snippets.

Sample Configuration File

In accordance with the foregoing use case scenario for a library configuration file for the following method signature:

```
public static String toString(Reader input)
    throws IOException,
``` the sample configuration file should be:

```
---
library_name: "org.apache.commons.io" # The package name
library_function_name: "org.apache.commons.io.IOUtils.toString" # The function name including class name as well
library_code_link: "https://github.com/apache/commons-io"
documentation_link: "https://commons.apache.org/proper/commons-io/apidocs/org/apache/commons/io/IOUtils.html#toString(java.io.Reader)"
signature:
        method_parameter_types:
            - java.io.Reader
        return_type:
            - java.lang.String
custom_inputs:
        - input:
            - type: ["java.lang.String"]
              input_value: ["Good Morning"]
              transform_function: getReader
transform_function_snippets:
        imports:
            built_in:
                - java.io.*
        code:
            - function_code: |
                public static Reader getReader(String data) {
                    StringReader reader = new StringReader(data);
                    return reader;
                }
equal_function_True: [ output == expected_output or output.strip( ) == expected_output.strip( ) or ''.join(output.splitlines( )) == ''.join(expected_output.splitlines( ))]
equal_function_False: [ output != expected_output, output is None or expected_output is None ]
code_snippets:
        imports:
            built_in:
                - java.io.*
                - java.util.*
        code:
            - function_code: |
                public static String lib_readFile(InputStreamReader is) throws IOException {
                    StringBuilder s = new StringBuilder( );
                    BufferedReader br = new BufferedReader(is);
                    while (br.ready( )) {
                        s.append(br.readLine( ));
                        s.append("\n");
                    }
                    String s2 = s.toString( );
                    br.close( );
                    return s2;
                }
            - function_code: |
                public static String lib_readFile(Socket sock, String cmd) throws IOException {
                    OutputStream outstream = sock.getOutputStream( );
                    outstream.write(cmd.getBytes( ));
                    outstream.flush( );
                    sock.shutdownOutput( );
                    BufferedReader reader =
                        new BufferedReader(
                            new InputStreamReader(sock.getInputStream( )));
                    StringBuilder sb = new StringBuilder( );
                    String line;
                    while((line = reader.readLine( )) != null) {
                        sb.append(line + "\n");
                    }
                    return sb.toString( );
                }
            - function_code: |
                public static String lib_readFile( ) throws IOException {
                    String s = "";
                    BufferedReader br = new BufferedReader(new FileReader(new File("ngramsy.txt")));
                    while (br.ready( )) {
                        s += br.readLine( );
                        s += "\n";
                    }
                    br.close( );
                    return s;
                }
...
```

Automation of Library Model Generation

To address the technical challenges that users experience when uploading a library file in the correct YAML file format and thereby facilitate the library model addition process, the assembly and submission of the library configuration file 232 during the library configuration model 231 input step in the workflow 200 may include an automated process for extracting or scraping information to automatically generate the library configuration file 232 in the correct format.

As a preliminary step in automating the generation of the library configuration file, a basic template is defined for a YAML library configuration file 232. In selected embodiments, any suitable templating engine (such as the Jinja or Jinja2 python template engine) may be used to define a basic YAML file template as follows:

```
---
library_name: "{{library_name}}"
library_function_name: "{{library_name}}.{{function_name}}"
documentation_link: "{{documentation_link}}"
library_code_link: "{{library_code_link}}"
signature:
        method_parameter_types:
            {% for i in function_parameters -%}
            - {{i}}
            {% endfor %}
        return_type:
            - {{return_type}}
equal_function_True: [ output == expected_output]
equal_function_False: [ output != expected_output, output is None or expected_output is None ]
code_snippets: {code: {{code}}}
description:
        code: "{{function_name}}({{function_parameters_string}})"
        advantages:
            - name: "Maintainability"
              rating: 3
              description: "Code is less complex, clearer and easy to understand since Apache Commons Lang is a popular library.Hence the code becomes more maintainable"
            - name: "Robustness"
              rating: 4
              description: "They have a very active community and hence the chances of bugs in the library code is less and the fixes are frequent making the code robust"
            - name: "Documentation"
              rating: 3
```

```
        description: "There is complete and ample documentation given for
the given library"
      - name: "Test Coverage"
        rating: 3
        description: "This library has a comprehensive set of developer
tests, providing assurance of the library quality"
      - name: "Maturity"
        rating: 3
        description: "The library has been under active development since
2002. It is a mature and reliable code base"
code_type: "{{code_type}}"
maven_link: "{{maven_link}}"
logo_image_link: "{{logo_image_link}}"
summary: "{{description}}"
number_of_lines: 1
...
```

Continuing with this example YAML file template, the library configuration model 231 may include an extraction module (e.g., extractor 17 in FIG. 1) which is configured to extract the "library_name" and "function_name" parameters from the documentation link identified at the "document_link" parameter. In addition, the extraction module may be configured to extract the "function_parameters" from the content of the page. For example, the extraction module scrapes the web page to find where the tag corresponding to the particular function is present, and then uses the tag to extract the return type and parameters which are passed to it. The extraction module works in a similar fashion to extract the "return_type" parameter from the page. In order to assemble the "transform_function" parameters, the extraction module may be configured to collect basic transform function and add them as a source project to an online hosting service (such as GitHub), and then use the "function_parameter" and "return_type" parameters to search the hosting service and retrieve it. The "description" parameter may be assembled by using the extraction module to scrape the web page of the given library function. In order to extract the "code_type" parameter, the "library class_name" parameter may be mapped to the "code_type" parameter which can then be extended by the extraction module. And for the "code" parameters which provide the code snippets used for fuzzy/internal matching, the extraction module may be configured to extract these snippets by scraping repositories at an online hosting service (e.g., GitHub). The extraction module may also extract the "custom_input_data" parameters from test cases of the given library function, thereby providing custom input test cases. If a library logo image link is to be included in the library configuration file, the extraction module may be configured to extract a "logo_image_link" parameter from an internally stored dictionary. In similar fashion, the extraction module may be configured to access an internally stored dictionary to retrieve a "library_code_link" parameter that provides a code link to the library name mapping and/or a "maven_link" parameter specifying a Mavenlink repository location for the library configuration file.

As disclosed herein, the extraction module may conduct an iterative sequence of operations to retrieve, scrape or extract information parameters to populate data fields in the YAML library configuration file 232. In an example of a sample model for the library function "StringUtils.swapCase" present in the apache commons library which swaps the case of the characters in the string (e.g., converts the lowercase letters of the String to uppercase and vice versa), a first iterative pass may generate an initial version of the YAML library configuration file as set forth below:

```
---
library_name: "org.apache.commons.lang3"
library_function_name: "org.apache.commons.lang3.StringUtils.-
swapCase"
documentation_link: "https://commons.apache.org/proper/commons-
lang/apidocs/org/apache/commons/lang3/StringUtils.html#swapCase-
java.lang.String-"
library_code_link: "https://github.com/apache/commons-lang"
signature:
    method_parameter_types:
      - java.lang.String
    return_type:
      - java.lang.String
equal_function_True: [ output == expected_output ]
equal_function_False: [ output != expected_output, output is None or
expected_output is None ]
code_snippets: {code: [ ]}
description:
    code: "StringUtils.swapCase(java.lang.String)"
    advantages:
      - name: "Maintainability"
        rating: 3
        description: "Code is less complex, clearer and easy to understand
since Apache Commons Lang is a popular library.Hence the code becomes
more maintainable"
      - name: "Robustness"
        rating: 4
        description: "Apache Foundation is a very active community and
hence the chances of bugs in the library code is less and the fixes are
frequent making the code robust"
      - name: "Documentation"
        rating: 3
        description: "There is complete and ample documentation given for
Apache Commons Lang Library"
      - name: "Test Coverage"
        rating: 3
        description: "Apache Commons Lang has a comprehensive set of
developer tests, providing assurance of the library quality"
      - name: "Maturity"
        rating: 3
        description: "The library has been under active development since
2002. It is a mature and reliable code base"
code_type: "String Manipulation"
maven_link: "http://mvnrepository.com/artifact/org.apache.commons/
commons-lang3/3.4"
logo_image_link: "http://s20.postimg.org/4g0cz3ayh/apache.png"
summary: "Swaps the case of a String changing upper and title case to
lower case, and lower case to upper case."
number_of_lines: 1
...
```

As seen above, the initial version of the YAML library configuration file does not include the "custom_inputs" data field. To retrieve these custom inputs, the extraction module may be configured to download the open source code for a candidate library function, and then scrape the downloaded source code to extract the test cases contained therein. The test case extraction process may use one or more predetermined extraction parameters to identify test cases, such as by checking the files with a "test" keyword in the absolute path name of the file and/or by checking if a particular type of test library (e.g., JUnit) is used or imported in the file. The identified test files may then be scraped to extract the test case input parameters which are passed into the specified library function so that the generated outputs may be captured. The extraction of the test case input parameters from the test file code may involve a multi-step process for parsing and pruning test files, finding parameters, and resolving parameters definition along with imports.

In a first or preliminary step, the extracted test case files are first parsed to check if the given library function is called within a given test file. By narrowing the test case extraction processing to only those test case files which call the specified library function, the test case files are pruned down to the function where it is getting called from.

In a second step, the pruned test file cases are processed or scraped to find the parameters to the library function which will serve as inputs to the blackbox matching engine. Since the test cases can be considered as covering the end-to-end feature of a library function, the second step ensures that the test cases have a required level of diversity, breadth, and depth needed by blackbox matching engine to yield good results. In addition, the second step may perform a basic check to ensure sure that the type of parameters passed on to the given library function is same type as used by the method signature.

In a third step, each test case file's parameters identified in the second step are resolved with the imports of the test case file. This step may be done by using AST parsing to resolve the variables which are defined either as class variables or function variables. For example, a plyj parser can be used to parse the code, check for variable definitions, and then replace the declaration with the definition. As will be appreciated, it may be necessary to modify the basic extraction approach for file-based inputs. And to address situations where the test case file is using unknown imports, the imports of each test case file are also scraped. With this multi-step approach, the custom inputs to a particular library function may be identified and extracted.

As a result of the additional iterative pass described hereinabove, an intermediate YAML library configuration file may be generated as set forth below:

```
---
library_name: "org.apache.commons.lang3"
library_junction_name: "org.apache.commons.lang3.StringUtils.-
swapCase"
documentation_link: "https://commons.apache.org/proper/commons-
lang/apidocs/org/apache/commons/lang3/StringUtils.html#swapCase-
java.lang.String-"
library_code_link: "https://github.com/apache/commons-lang"
signature:
          method_parameter_types:
              - java.lang.String
          return_type:
              - java.lang.String
custom_inputs:
          - input:
              - "abc"
          - input:
              - "aBc"
          - input:
              - "The dog has BONE"
          - input:
              - "CAT"
          - input:
              - "Cat"
equal_function_True: [ output == expected_output ]
equal_function_False: [ output != expected_output, output is None or expected_output is None ]
code_snippets: {code: [ ]}
description:
     code: "StringUtils.swapCase(java.lang.String)"
     advantages:
       - name: "Maintainability"
         rating: 3
         description: "Code is less complex, clearer and easy to understand since Apache Commons Lang is a popular library.Hence the code becomes more maintainable"
       - name: "Robustness"
         rating: 4
         description: "Apache Foundation is a very active community and hence the chances of bugs in the library code is less and the fixes are frequent making the code robust"
       - name: "Documentation"
         rating: 3
         description: "There is complete and ample documentation given for Apache Commons Lang Library"
       - name: "Test Coverage"
         rating: 3
         description: "Apache Commons Lang has a comprehensive set of developer tests, providing assurance of the library quality"
       - name: "Maturity"
         rating: 3
         description: "The library has been under active development since 2002. It is a mature and reliable code base"
     code_type: "String Manipulation"
     maven_link: "http://mvnrepository.com/artifact/org.apache.commons/commons-lang3/3.4"
     logo_image_link: "http://s20.postimg.org/4g0cz3ayh/apache.png"
     summary: "Swaps the case of a String changing upper and title case to lower case, and lower case to upper case."
     number_of_lines: 1
...
```

As seen above, the intermediate version of the YAML library configuration file does not include data for the "code" entry for the "code_snippets" data field. To retrieve these code snippets, the extraction module may be configured to conduct an additional iterative pass to find the code snippets by scraping an online repository hosting service (e.g., GitHub) using custom inputs extracted for input/output matching from the online repository. In addition or in the alternative, the "custom_inputs" present in the initial version of the YAML library configuration file contains some sample test cases for the library function. By passing these test cases to the input/output matching engine (e.g., blackbox matching engine 228) in a second iterative pass, they may be analyzed on a repository of open source projects by injecting these test cases into the codes of each of the projects. The result can then be used to automatically identify snippets that could be used as sample code snippets for the library model. As a result of the second iterative pass, the final YAML library configuration file may be generated as set forth below:

```
---
library_name: "org.apache.commons.lang3"
library_function_name: "org.apache.commons.lang3.StringUtils.-
swapCase"
documentation_link: "https://commons.apache.org/proper/commons-
lang/apidocs/org/apache/commons/lang3/StringUtils.html#swapCase-
java.lang.String-"
library_code_link: "https://github.com/apache/commons-lang"
signature:
          method_parameter_types:
              - java.lang.String
          return_type
              - java.lang.String
custom_inputs:
          - input:
              - "abc"
          - input:
              - "aBc"
          - input:
              - "The dog has BONE"
          - input:
              - "CAT"
          - input:
              - "Cat"
equal_function_True: [ output == expected_output ]
equal_function_False: [ output != expected_output, output is None or expected_output is None ]
code_snippets:
          code:
              - function_code: |
                  public static String swapCase1(String
                  string_val)
```

-continued
```
{
    if(string_val == null ||
string_val.length( ) == 0) {
        return string_val;
    }
    final char[ ] buffer = string_val.toCharArray( );
    for (int i = 0; i < buffer.length; i++) {
        final char ch = buffer[i];
        if (Character.isUpperCase(ch)) {
            buffer[i] = Character.-
            toLowerCase(ch);
        } else if (Character.isTitleCase(ch)) {
            buffer[i] = Character.-
            toLowerCase(ch);
        } else if (Character.-
        isLowerCase(ch)) {
            buffer[i] = Character.-
            toUpperCase(ch);
        }
    }
    return new String(buffer);
}
  - function_code: |
      public static String swapCase2(String string_val) {
          if(string_val == null) {
              return null;
          } else if(string_val.length( ) == 0) {
              return "";
          }
          final char[ ] buffer = string_val.toCharArray( );
          for (int i = 0; i < buffer.length; i++) {
              final char ch = buffer[i];
              if (Character.isUpperCase(ch)) {
                  buffer[i] = Character.toLowerCase(ch);
              } else if (Character.-
              isTitleCase(ch))
              {
                  buffer[i] = Character.toLowerCase(ch);
              } else if (Character.-
              isLowerCase(ch))
              {
                  buffer[i] = Character.toUpperCase(ch);
              }
          }
          return new String(buffer);
      }
  - function_code: |
      public static String swapCase3(String string_val) {
          if(string_val != null && string_val.length( ) != 0) {
              final char[ ] buffer = string_val.toCharArray( );
              for (int i = 0; i < buffer.length; i++) {
                  final char ch = buffer[i];
                  if (Character.-
                  isUpperCase(ch)) {
                      buffer[i] = Character.toLowerCase(ch);
                  } else if
                  (Character.isTitleCase(ch)) {
                      buffer[i] = Character.toLowerCase(ch);
                  } else if
                  (Character.isLowerCase(ch)) {
                      buffer[i] = Character.toUpperCase(ch);
                  }
              }
              return new String(buffer);
          }
```
```
          return string_val;
      }
  - function_code: |
      public static String swapCase4(String string_val) {
          if(string_val != null && string_val.length( ) != 0) {
              final char[ ] buffer = string_val.toCharArray( );
              for (int i = 0; i < buffer.length; i++) {
                  final char ch = buffer[i];
                  if (Character.-
                  isUpperCase(ch)) {
                      buffer[i] = Character.toLowerCase(ch);
                  } else if
                  (Character.isTitleCase(ch)) {
                      buffer[i] = Character.toLowerCase(ch);
                  } else if
                  (Character.isLowerCase(ch)) {
                      buffer[i] = Character.toUpperCase(ch);
                  }
              }
              return new String(buffer);
          } else if(string_val == null) {
              return null;
          }
          return string_val;
      }
  - function_code: |
      public static String swapCase5(String string_val) {
          if(string_val != null && string_val.length( ) != 0) {
              final char[ ] buffer = string_val.toCharArray( );
              for (int i = 0; i < buffer.length; i++) {
                  final char ch = buffer[i];
                  if (Character.-
                  isUpperCase(ch)) {
                      buffer[i] = Character.toLowerCase(ch);
                  } else if
                  (Character.isTitleCase(ch)) {
                      buffer[i] = Character.toLowerCase(ch);
                  } else if
                  (Character.isLowerCase(ch)) {
                      buffer[i] = Character.toUpperCase(ch);
                  }
              }
              return new String(buffer);
          } else if(string_val != null) {
              return "";
          }
          return null;
      }
description:
    code: "StringUtils.swapCase(java.lang.String)"
    advantages:
      - name: "Maintainability"
        rating: 3
        description: "Code is less complex, clearer and easy to understand since Apache Commons Lang is a popular library.Hence the code becomes more maintainable"
      - name: "Robustness"
        rating: 4
        description: "Apache Foundation is a very active community and hence the chances of bugs in the library code is less and the fixes are frequent making the code robust"
      - name: "Documentation"
        rating: 3
        description: "There is complete and ample documentation given for Apache Commons Lang Library"
```

```
       - name: "Test Coverage"
         rating: 3
         description: "Apache Commons Lang has a comprehensive set of
developer tests, providing assurance of the library quality"
       - name: "Maturity"
         rating: 3
         description: "The library has been under active development since
2002. It is a mature and reliable code base"
    code_type: "String Manipulation"
    maven_link: "http://mvnrepository.com/artifact/org.apache.commons/
commons-lang3/3.4"
    logo_image_link: "http://s20.postimg.org/4g0cz3ayh/apache.png"
    summary: "Swaps the case of a String changing upper and title case to
lower case, and lower case to upper case."
    number_of_lines: 1
```

To provide additional details for an improved understanding of selected embodiments of the multi-step process for parsing and pruning test files, finding parameters, and resolving parameters definition along with imports, reference is now made to the use case scenario the following library function:

```
    org.apache.commons.io.FilenameUtils.isExtension with url as
    'https://github.com/apache/commons-io'
``` where an example test case is:

```
custom_inputs_isExtension = ['("file.txt", new String[ ]{"txt"})', '(null,
(String[ ]) null)',
                            '("a\\\\b\\\\file.txt", new String[ ]{"rtf"})',
'("a.b\\\\file.txt", new String[ ]{"rtf"})',
                            '("file", new String[ ]{"rtf", ""})',
'("file.txt", new String[ ]{"rtf"})',
                            '("a\\\\b\\\\file.txt", (String[ ]) null)',
'("file.txt", new String[0])',
                            '("a.b\\\\file.txt", new String[ ]{"txt"})',
'("file.txt", (String[ ]) null)',
                            '("a.b/file.txt", new String[ ]{"rtf"})',
'("a\\\\b\\\\file.txt", new String[0])',
                            '("a.b/file.txt", new String[ ]{"rtf", "txt"})',
                            '("a\\\\b\\\\file.txt", new String[ ]{"txt"})',
'("a.b\\\\file.txt", (String[ ]) null)',
                            '("a/b/file.txt", new String[ ]{"rtf"})',
'("file.txt", new String[ ]{"rtf", "txt"})',
                            '("a/b/file.txt", (String[ ]) null)',
'("a.b\\\\file.txt", new String[0])',
                            '("a/b/file.txt", new String[0])',
'("a.b\\\\file.txt", new String[ ]{"TXT"})',
                            '("a.b/file.txt", new String[0])',
'("a.b/file.txt", (String[ ]) null)',
                            '("a/b/file.txt", new String[ ]{"rtf", "txt"})',
'("file", (String[ ]) null)',
                            '("a.b\\\\file.txt", new String[ ]{"TXT",
"RTF"})',
                            '("a.b\\\\file.txt", new String[ ]{"rtf",
"txt"})', '("a/b/file.txt", new String[ ]{"txt"})',
                            '("a.b/file.txt", new String[ ]{"txt"})',
                            '("a\\\\b\\\\file.txt", new String[ ]{"rtf",
"txt"})']
```

In the foregoing example, it can be seen that numerous inputs have been extracted for the same library function. In addition, the corresponding extracted imports are:

```
extracted_imports = ['java.io.BufferedOutputStream', 'java.io.File',
'java.io.FileOutputStream', 'java.io.IOException', 'java.util.ArrayList',
'java.util.Arrays', 'java.util.Collection']
```

These imports and sample inputs are then passed to generate custom outputs by autogenerating code and then passing jar from the same.

```
extracted_outputs = [True, False, False, False, True, False, False, False,
True, False, False, False, True, True, False, False, True, False, False,
False, False, False, False, True, True, False, True, True, True, True]
```

Validation of Library Configuration File

To address the technical challenges that users experience when uploading a proposed library file in the correct YAML file format and prevent knowledge base corruption from improperly uploaded files, the assembly and submission of the library configuration file 232 during the library configuration model 231 input step in the workflow 200 may include an automatic validation process to make sure that the library configuration file 232 is in the correct format and satisfies predetermined constraints required for the library suggestion engine 201. For example, selected embodiments of the present disclosure employ a YAML validator which uses a python package to validates whether the content of the YAML library configuration file 232 is correct or not. While validation processing to check a YAML file with normal strings is relatively straightforward, the complexity of the processing task increases when validating the code snippets 234 and the transform function snippets for the custom inputs 235 in the library configuration model 231. However, by properly templatizing and compiling the library functions, the correctness of the code snippets can be checked. To this end, the library model addition engine may include a YAML validator (e.g., validator 18 in FIG. 1) which is stored locally or hosted on an accessible server for installation and local use. In operation, the YAML validator may be configured to fill-in predetermined data structure fields of the YAML library configuration file 232, such as by scraping the webpage of a given library or otherwise populating the YAML library configuration file with specified values. In addition, the YAML validator may be configured to perform multiple different validation operations on the submitted YAML library configuration file so as to check the YAML format, check the YAML file fields for correctness, check the validity of code snippets and transform function snippets, such as by removing false positives from the custom inputs for the input/output matching engine.

In accordance with selected embodiments of the present disclosure, the YAML validator may be configured to perform YAML format validation test to determine if the format of the YAML library configuration file 232 is fine or not. In addition, the YAML validator may be configured to check whether the fields provided in the YAML library configuration file 232 are correct. In selected embodiments, the file validity check may be performed with a suitable Python data validation library, such as Voluptuous (https://github.com/alecthomas/voluptuous). In addition, the YAML validator may be configured to confirm that the links in the YAML library configuration file 232 (e.g., the documentation link, maven link, etc.) are working links. In addition, the YAML validator may be configured to determine whether the number of code snippets is greater than a specified minimum or threshold needed for decent quality. In selected embodiments of the YAML validator, the YAML library configuration file 232 is checked for URL validation, logo image link validation, supported types validation, file data validation, transform function validation, custom inputs type validation, supported return type validation, and/or library description basic validation. While most of the type validation can be implemented with the Voluptuous data validation library, support has been added in Voluptuous for non-supported type validations, with contributions for the same being checked in at https://github.com/alecthomas/voluptuous/graphs/contributors.

In accordance with selected embodiments of the present disclosure, the YAML validator may be configured to perform validation testing of the code snippets in the YAML library configuration file 232 that are used for fuzzy or internal match processing. Such validity testing may include checking that, given suitable imports and proper class names, all the code snippets are individually compilable. If the code snippets are not compilable, the YAML validator indicates that the YAML library configuration file is not correct.

In accordance with selected embodiments of the present disclosure, the YAML validator may be configured to perform validation testing of the transform functions, custom inputs, and method signature in the YAML library configuration file 232 that are used for input/output match processing. Such validity testing may include checking that if the transform function snippets are compilable and/or not in accordance with the method signature. In addition, the YAML validator may be configured to check if the custom inputs provided are correct (i.e., satisfy the method signature). If not, the YAML validator indicates that the YAML library configuration file is faulty. The YAML validator may also be configured to check that, given the JAR for a library function, outputs can be generated with respect to a given set of custom inputs.

In accordance with selected embodiments of the present disclosure, the YAML validator may be configured to perform validation testing of the custom inputs and outputs in the YAML library configuration file 232 that are used for input/output match processing by removing false positives from the custom input/outputs. In order to increase the accuracy of the input/output match processing, the test cases should be generated with respect to the parameters required by the library function. While one approach for tackling this problem is to generate random test cases with respect to a particular type (e.g., for a "String" type, the generated test cases could be " ", "a", "ab", "abc", etc), there are drawbacks to this approach since it does not take into consideration the metadata involved in the library function. For example, an apache commons function, like isExtension, which takes in two strings as inputs and checks if the second input string is extension of first input string, the validation test should ensure that the context remains so that, for example isExtension('file.txt', 'txt') makes more sense than isExtension('a', 'b'). In order to obtain the context, the YAML validator may be configured to scrape the test cases prepared for a given library function by retrieving the source of entire library and then heuristically checking if a given file is a test file or not. If the file is a test file, then the validator checks for the usage of isExtension in the file and then scrapes the corresponding inputs. By doing this, the number and quality of custom inputs is significantly increased, thereby increasing the accuracy of the input/output match processing engine.

By using the YAML validator to check the YAML library configuration file 232 for correct formatting, code snippets, transform functions, custom inputs, and method signature validity, developers can smoothly generate and test the library models locally on their system.

Figure 3:
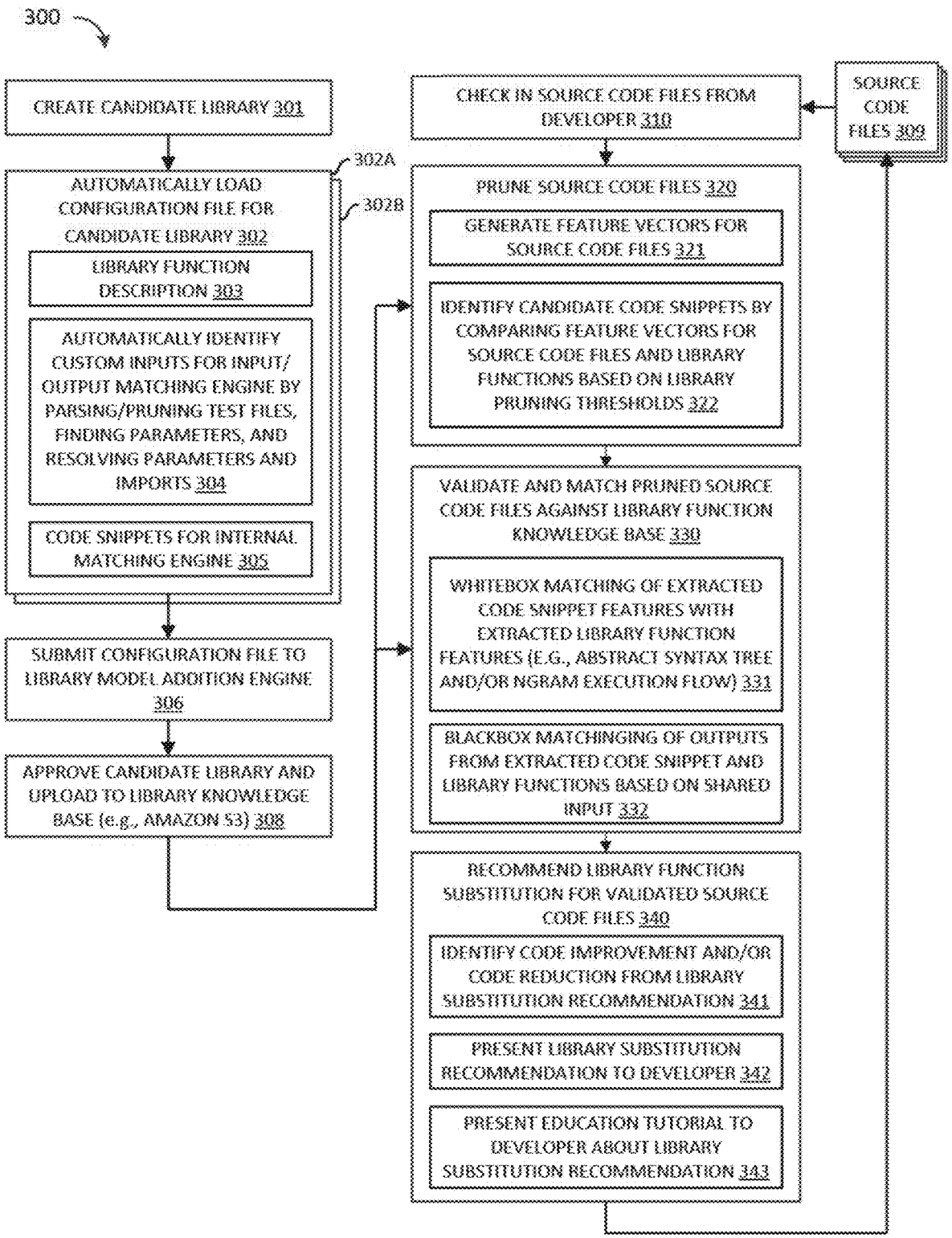
FIG. 3 illustrates a simplified flow chart showing the logic for submitting validated library models which may be recommended for library function substitutions to a developer in accordance selected embodiments of the present disclosure.

To provide additional details for an improved understanding of selected embodiments of the present disclosure, reference is now made to FIG. 3 which depicts a simplified flow chart 300 showing the logic for submitting validated library models which may be recommended for library function substitutions to a developer. The processing shown in FIG. 3 may be performed by a cognitive system, such as the computing system 100 shown in FIG. 1 or other natural language processing system.

At step 301, a candidate library model is created, written, or retrieved by a developer. At this point in the software development process, the candidate library model code has not been validated for addition to the library knowledge base.

Using data extracted from or describing the candidate library model, a library configuration file is automatically created and loaded at step 302. In selected embodiments, the library configuration file may be automatically generated at step 302 by filling a configuration file template with extracted data using an iterative sequence of operations 302A-B to retrieve, scrape or extract data to automatically populate to a plurality of data fields in the configuration file template which contain information identifying the library model, a set of custom inputs for the library model, and a set of code snippets that are functionally similar to the library model. The assembled library configuration file 302 may include library function description information 303, such as the library name, library function name, library descriptors, related documentation links, and method signature for the library function. The library configuration file 302 may also include custom input information 304 that is used for input/output matching. In accordance with the present disclosure, the custom inputs 304 in each configuration file for use with evaluation by the input/output matching engine may be automatically identified with a multi-step process for parsing/pruning test files, finding parameters, and resolving the parameters and imports to generate library function custom input test cases. In addition, the library configuration file 302 may include code snippet information 305 that is used for fuzzy or internal matching. In accordance with the present disclosure, the code snippets 305 in each configuration file for use with evaluation by the internal matching engine may be automatically identified by using library function test cases 305 to analyze open source projects and thereby identify the functionally similar code snippets. In selected embodiments, the library configuration file 302 may be structured as a human-readable data serialization language, such as YAML.

At step 306, the configuration file is submitted to the library model addition engine. At this point, the library configuration file for the candidate library model may be evaluated to ensure that the file is in the correct format and satisfies the constraints provided by the library recommendation engine. In selected embodiments, a YAML validator may be implemented as a python package which validates whether the content of a YAML library configuration file is correct or not, and to determine if the code snippets and transform function snippets from the library configuration file may be compiled.

Once validated, the approved candidate library model is uploaded to the library knowledge base, such as the Amazon Simple Storage Service (S3) (step 308) where it may be used to generate customized code suggestions for library function substitutions for a programmer's submitted source code. In particular and as described more fully below, the approved candidate library model includes library function information and library function code snippets that may be used in the library recommendation process steps 310, 320, 330, 340.

For example, the library recommendation process begins at step 310 when the source code files are written or retrieved by a developer, and then checked in or committed. At this point in the software development process, the source code includes untested code that may be fragile, bloated, untested, and low quality code which contains undiscovered bugs and is otherwise inefficient and not readily readable.

At step 320, input source code files are pruned or filtered to identify source code files that are likely candidates for library function suggestions while removing source code files that do not have certain keywords that are most likely to qualify for library function suggestions. The processing performed at step 320 may use machine learning, natural language processing, and/or artificial intelligence techniques to find keywords in the input source code files and then assign a priority or weight value. In selected embodiments, the pruning step 320 may be implemented with a feature vector generation step 321 which uses vector formation techniques to generate feature vectors for each input source code file. Using the generated feature vectors along with library function feature vectors retrieved from memory, candidate code snippets from the input source code files may be identified at step 322 by comparing the input source code file feature vectors and the library function feature vectors to generate a numerical similarity measure that may be compared with a pruning threshold values for the corresponding library function. The computation steps performed at step 322 to identify similarities between the feature vectors may include tokenizing input code snippets and code snippets from the library functions to generate comparative file vectors which are evaluated (e.g., by dot product) against a pruning threshold to identify candidate code snippets, checking for the presence of predetermined words in the input code and assigning a corresponding weight, or by any other suitable code filtering operations for identifying candidate code snippets from the input code that should be further processed for library suggestion opportunities.

At step 330, the pruned input source code files (e.g., candidate code snippets) are validated and matched with library function information contained in the knowledge base to identify validated source code files (e.g., validated code snippets). The processing performed at step 320 may use machine learning, natural language processing, and/or artificial intelligence techniques in combination with static and/or dynamic code analysis to identify and validate input source code files that likely qualify for library function suggestions. In selected embodiments, the validation and matching step 330 may be implemented with a first match processing step 331 which matches code snippet features extracted from an input source code file with extracted library function features, such as by using abstract syntax tree and/or Ngram execution flow matching algorithms. In effect, the first match processing step 331 performs fuzzy matching of the structural syntax and/or bytecode execution flow using automated matching threshold values (e.g., AST size and distance thresholds and/or Ngram thresholds).

In selected embodiments, the validation and matching step 330 may also include a second match processing step 332 which performs input/output matching by injecting shared inputs to input code snippets and library function code snippets to detect matching outputs, thereby generating validated code snippets which can be replaced by a library function. In effect, the second match processing step 332 performs exact matching to confirm that the code snippets are the same if the same input yields the same outputs. In selected embodiments, the second match processing step 332 may be configured to extract library signature information from a library function, and to then extract candidate code snippets. The extracted candidate code snippets may then be templated according to the extracted library signature and then compiled so that a shared input is injected into the compiled code to generate outputs which are compared to outputs generated from the library function on the basis of the shared input.

At step 340, the library function substitutions are recommended for each validated source code file (e.g., validated code snippets) so that the program developer is presented with one or more library function recommendations which include may include code lines from input source code files along with code lines from the library function suggestion, alone or in combination with additional library function information identifying the code improvement recommendation and/or code reduction resulting from the library function recommendation and/or educational tutorial information relating to the implementation of the library function recommendation. The processing performed at step 340 may be performed by a cognitive system, such as the computing system 100 shown in FIG. 1 or other data processing system functionality for displaying user interface information. In selected embodiments, the recommendation step 340 may be implemented with a first processing step 341 which identifies a code improvement and/or code reduction from the library substitution recommendation, such as by quantifying a performance benefit or potential code reduction that would result from using the library function recommendations. In addition, the recommendation step 340 may include a second processing step 342 which presents the library substitution recommendation to the developer, alone or in combination with information about a code improvement or code reduction. As will be appreciated, the library substitution recommendation presented at step 342 may be included in the same user interface screen or a different user interface screen in which the code improvements and/or code reductions are identified for the developer. In addition, the recommendation step 340 may include a third processing step 343 which presents the developer with an education tutorial about the library substitution recommendation, such as by displaying the recommended replacement code for recommended library function along an explanation of the benefits of the recommended library function, a link to the suggested library function, and a video explaining how to implement the suggested library function.

Figure 4A:
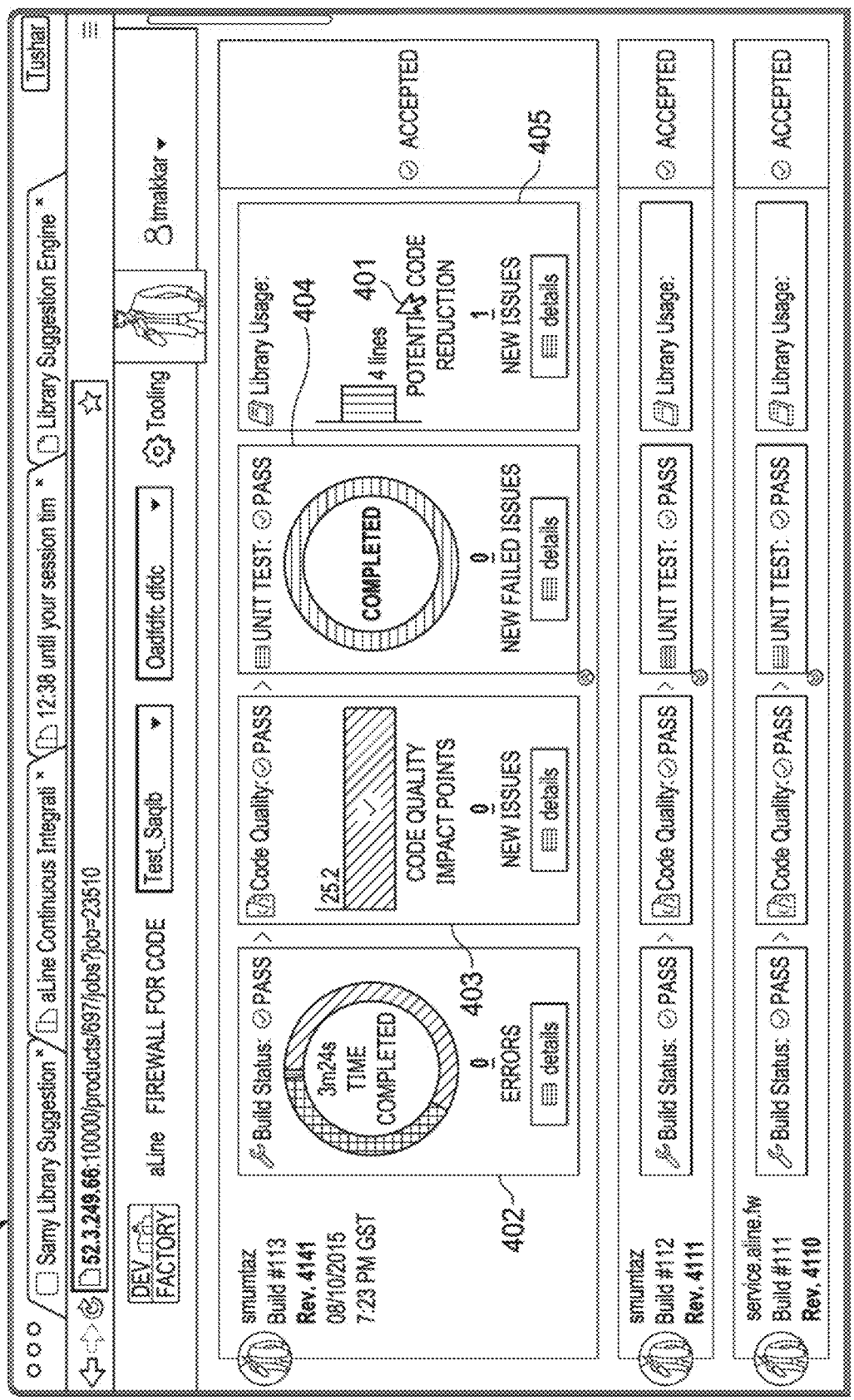
FIG. 4A is a first example screen shot of a user interface of a library model addition engine which illustrates the evaluation of input source code files in accordance selected embodiments of the present disclosure.
Figure 4C:
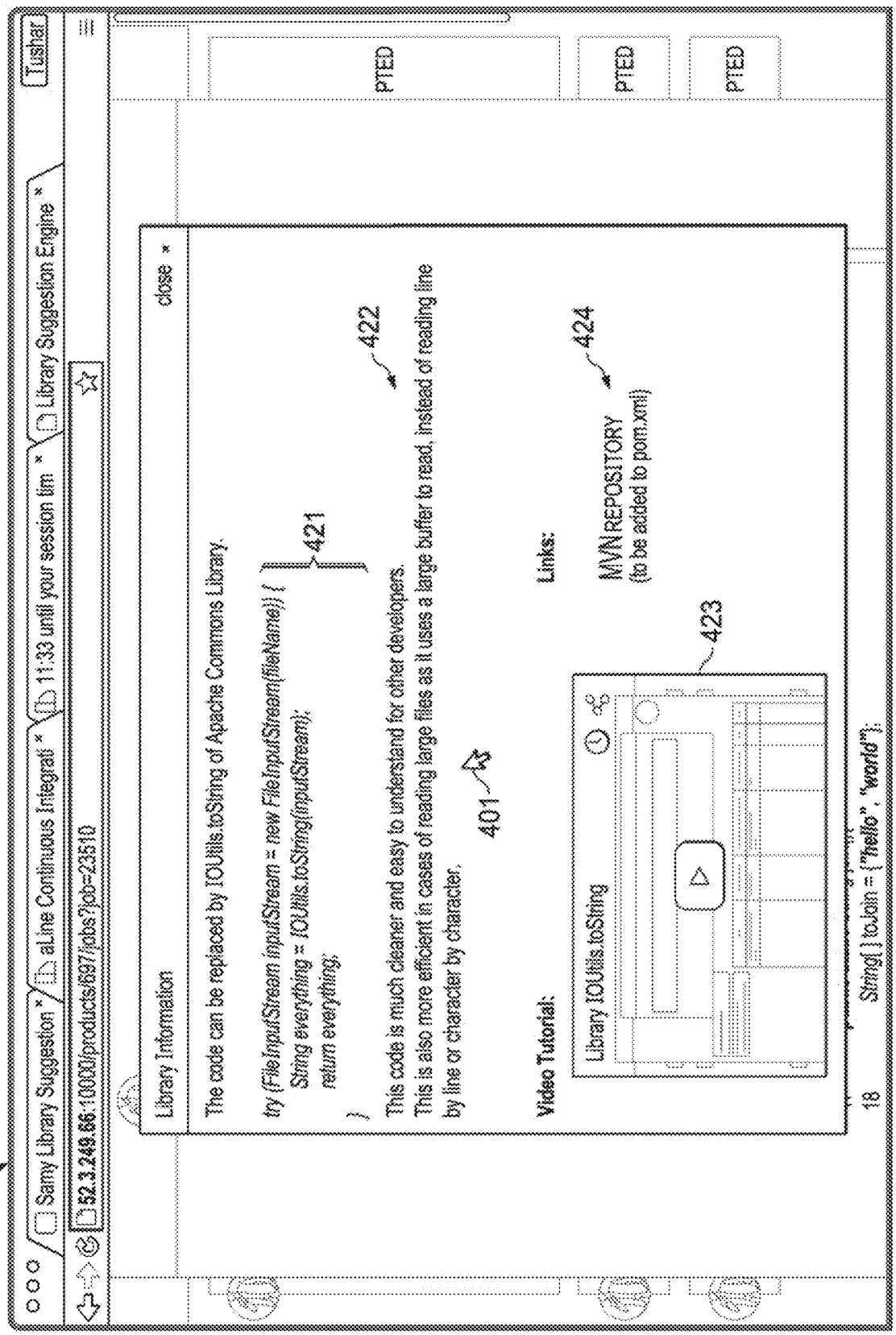
FIG. 4C is a third screen shot of a user interface of a library suggestion engine which illustrates a library function recommendation for an input source code file in accordance selected embodiments of the present disclosure.

To provide additional details for an improved understanding of selected embodiments of the present disclosure, reference is now made to FIGS. 4A-C which depict an example sequence of user interface screen shots for a library suggestion engine in accordance selected embodiments of the present disclosure. In the first example screen shot of user interface 400 shown in FIG. 4A, there is displayed is a shown a summary or overview for the evaluation of a plurality of input source code files for library suggestion recommendations. For example, the user interface 400 shows a build status report 402, code quality report 403, unit test report 405, and suggested library usage report 405 for a first input source code file (Build #113, Rev 4141) that has been committed or loaded into the library suggestion engine. As indicated in the library usage report 405, the user interface 400 indicates that one issue has been detected and that the recommended library function will reduce the size of the source code by four lines if selected by the developer for substitution or replacement.

By using the cursor 401 or other user interface controls to interact with the user interface 400, the developer may cause the library suggestion engine to display a second user interface screen shot 410 which illustrates a code reduction opportunity for the selected input source code file, as illustrated in FIG. 4B. In this example, the user interface 410 shows a file identification field 412 for the first input source code file (e.g., Build #113, Rev 4141), an auto-classification field 413, code line replacement field 414, a code reduction field 415, and a library field 416. The file identification field 412 identifies the input source code file. The auto-classification field 413 automatically shows that the first input source code file is a "file operation" file. The code line replacement field 414 shows the number of current code lines (in the validated code snippet) and the proposed number of code lines (from using the recommended library function). The code reduction field 415 shows a quantification of the code reduction benefit. And the library field 416 provides a link to additional information for educating the developer about how to implement the recommended library function. Below the fields 412-416, the second user interface screen shot 410 may also display the first input source code file 417 with the validated code snippet 418 highlighted or otherwise visually set off from the remaining lines of code in the input source code file 417. In order to access additional information relating to the recommended library function, the user interface 410 may include one or more user interaction links 419 in addition to the library field 416 so that, when actuated by the cursor 401, additional information about the recommended library function may be displayed.

Referring now to FIG. 4C, there is shown a third user interface screen shot 420 which illustrates additional library information 421-424 relating to the recommended library function for replacing the validated code snippet 418. In this example, the user interface 420 shows a first field 421 for identifying library code (e.g., IOUtils.toString of the Apache Commons Library) that can be used to replace the validated code snippet 418. The user interface 420 may also include a second field 422 for describing the benefits of using the library function recommendation. The user interface 420 may also include a video tutorial 423 and a link 424 to the library repository (e.g., maven repository). The video tutorial 423 can provide educational information to the programmer on how to replace the validated code snippet with the recommended library function and other information needed to migrate to the recommended library function.

Figure 5:
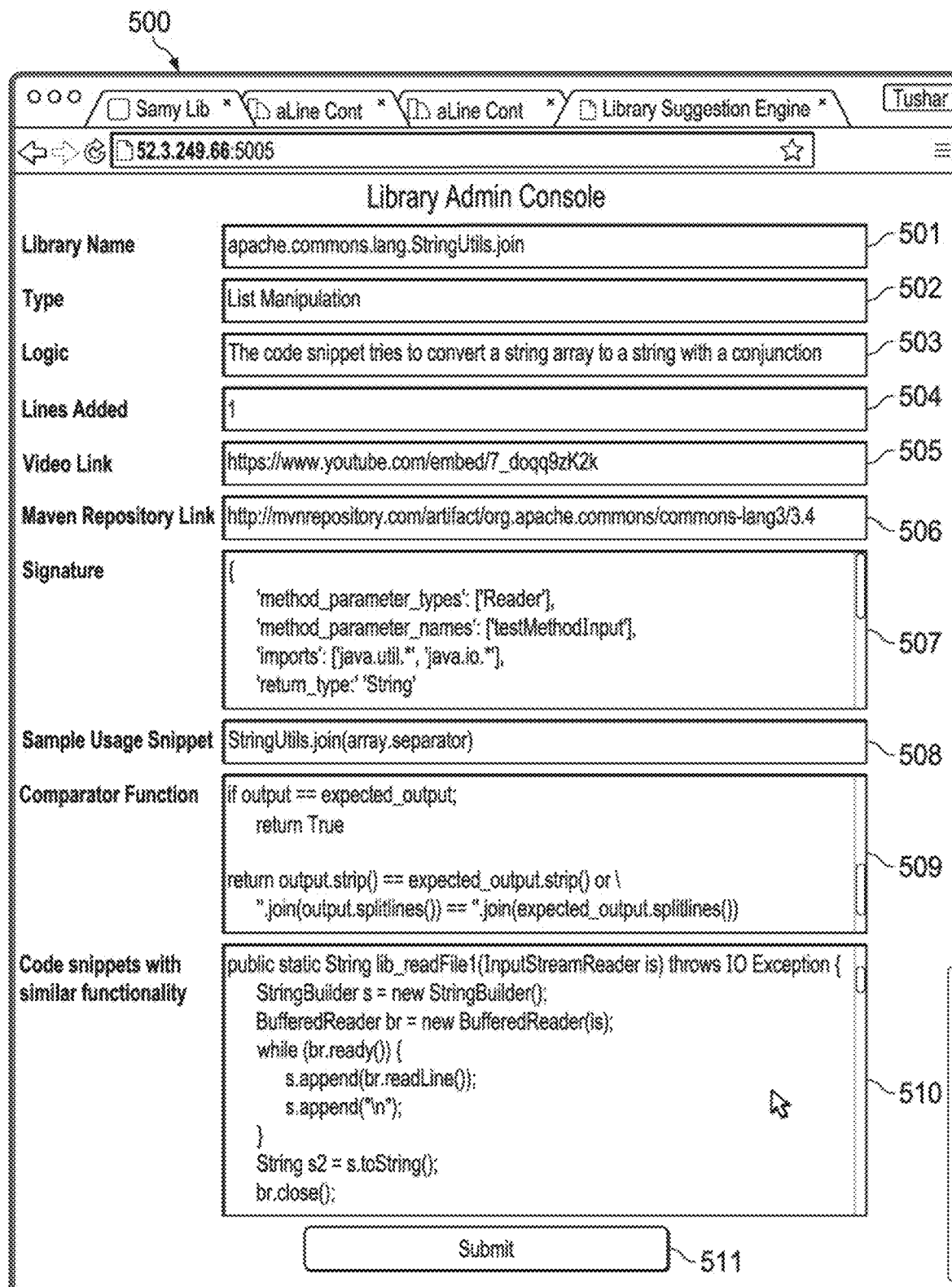
FIG. 5 is a screen shot of user interface of a library administrator console which illustrates the automatically populated data fields of a library configuration file representing a library function in accordance selected embodiments of the present disclosure.

To provide additional details for an improved understanding of selected embodiments of the present disclosure, reference is now made to FIG. 5 which depicts an example user interface screen shot 500 of a library administrator console which illustrates the automatically populated library configuration file data fields in accordance selected embodiments of the present disclosure. In the example screen shot of user interface 500, a plurality of fields 501-508 provide information about the candidate library function having data fields that that may be automatically populated, including a first data field 501 that is populated with the library name (e.g., "apache.commons.lang.StringUtils.join"), a second data field 502 that is populated with the library type (e.g., "List Manipulation"), a third data field 503 that is populated with a description of the library logic (e.g., "The code snippet tries to convert a string array to a string with a conjunction."), a fourth data field 504 that is populated with the number of lines added (e.g., "1"), an optional fifth data field 505 that is populated with an educational video link address (e.g., "https://www.youtube.com/embed/7_doqq-9zK2k"), an optional sixth data field 506 that is populated with a maven repository link for the location where the library function is stored (e.g., "http://mvnrepository.com/ artifact/org.apache.commons/commons-lang3/3.4"), a seventh data field 507 that is populated with the method signature (a portion of which is displayed), and an eighth data field 508 that is populated with a sample usage snippet (e.g., "StringUtilsjoin(array.separator)"). In addition, the ninth data field 509 is populated with the comparison function (a portion of which is shown) for comparing the outputs of two functions with the input/output matching engine. Finally, the tenth data field 510 is populated with code snippets with similar functionality to the candidate library function for use with a whitebox matching engine by using library function sample test cases as inputs to a blackbox matching engine to analyze open source projects and thereby identify the functionally similar code snippets. Though not shown, it will be appreciated that additional data fields may be included, such as custom inputs, pruning threshold values, pruning vectors, AST distance/size threshold values, Ngram threshold values, etc. Once the library administrator console data fields are filled in, the submit button 511 may be activated to upload the library configuration file to the library model addition engine for validation processing. If the submitted information is validated, then the library may be added to the library knowledge base. However, if issues arise in the validation process, they may be identified for resolution or correction by the user.

Figure 6:
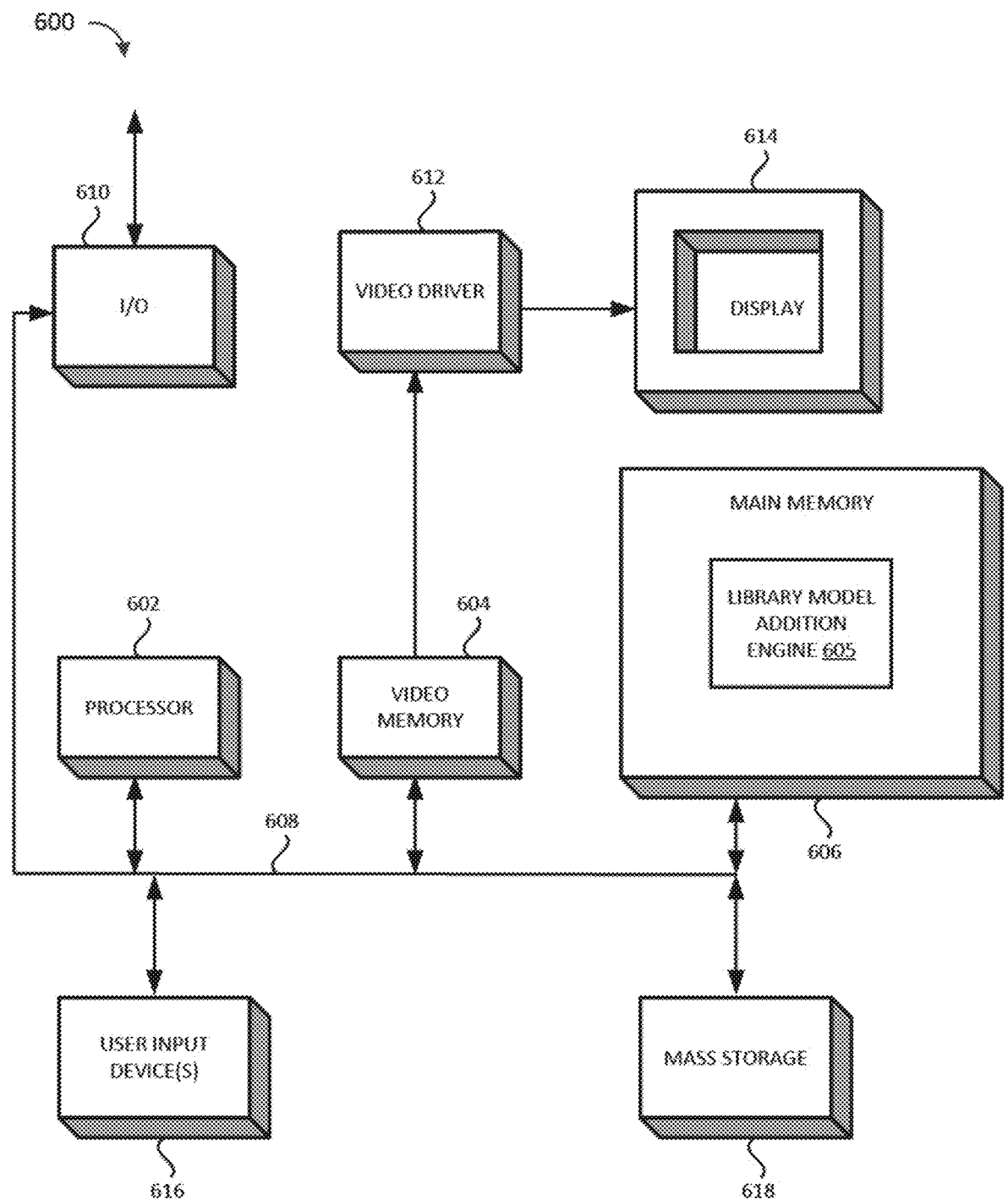
FIG. 6 is a simplified block diagram of a general-purpose computer in accordance with selected embodiments of the present disclosure.

Embodiments of the system and method for recommending library substitutions can be implemented on a computer system, such as a general-purpose computer 600 illustrated in FIG. 6. As disclosed the computer 600 includes input user device(s) 616, such as a keyboard and/or mouse, which are coupled to a bi-directional system bus 608. The input user device(s) 616 are used for introducing user input to the computer system 600 and communicating that user input to processor 602. The computer system 600 may also include a video memory 604, main memory 606, and mass storage 618, all coupled to bi-directional system bus 608 along with input user device(s) 616 and processor 602. The mass storage 618 may include both fixed and removable media, such as other available mass storage technology. Bus 608 may contain, for example, 32 address lines for addressing video memory 604 or main memory 606. The system bus 608 may also include, for example, an n-bit data bus for transferring data between and among the components, such as CPU 602, main memory 606, video memory 604, and mass storage 618, where "n" is, for example, 32 or 64. Alternatively, multiplex data/address lines may be used instead of separate data and address lines.

The computer 600 may also include I/O device(s) 610 which provide connections to peripheral devices, such as a printer, and may also provide a direct connection to remote server computer systems via a telephone link or to the Internet via an ISP. I/O device(s) 610 may also include a network interface device to provide a direct connection to remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 618 until loaded into main memory 606 for execution. Computer programs may also be in the form of electronic signals modulated in accordance with the computer program and data communication technology when transferred via a network. The method and functions relating to system and method for adding library models may be implemented in a computer program for a library recommendation engine 605.

The processor 602, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 606 is comprised of dynamic random access memory (DRAM). Video memory 604 is a dual-ported video random access memory. One port of the video memory 604 is coupled to video amplifier or driver 612. The video amplifier 612 is used to drive the display 614. Video amplifier 612 is well known in the art and may be implemented by any suitable means. This circuitry converts pixel data stored in video memory 604 to a raster signal suitable for use by display 614. Display 614 is a type of monitor suitable for displaying graphic images.

By now, it will be appreciated that there is disclosed herein a system, method, apparatus, and computer program product for enhancing operable functionality of a software program by performing a method at a device having an operating system and system library. As disclosed, the system, method, apparatus, and computer program is operative to add a library model to a library knowledge base by first receiving a software program to be submitted as a library model by a developer. From the library model, a library configuration file is generated in a human-readable format which is parsable by software (e.g., a YAML format library configuration file) by filling a configuration file template (e.g., a YAML format configuration file template) with extracted data to automatically populate a plurality of data fields in the library configuration file with information identifying the library model, where one or more of the data fields are filled by scraping a documentation page for the library model to extract test cases, and then scraping each test case to extract a set of custom input test cases for inclusion in the one or more data fields of the library configuration file. In selected embodiments, the library configuration file is generated by extracting the test cases and checking an absolute path name for each extracted test case for a test keyword and checking for one or more specified test library types are used or imported in the test case. In other embodiments, the library configuration file is generated by extracting the set of custom input test cases, parsing and pruning the extracted test cases, finding parameters to the candidate library model which will provide test cases with a required diversity, breadth and depth, and resolving the parameters and imports for each extracted test case. In other embodiments, the library configuration file is generated by conducting an iterative sequence of operations to retrieve, scrape or extract data to automatically populate the plurality of data fields in the YAML format configuration file template. For example, a first iterative pass may be performed to generate an initial version of the YAML library configuration file template in which only a subset of the plurality of data fields is filled with extracted data, and then a second iterative pass may be performed to generate a final version of the YAML library configuration file template in which one of the data fields in the YAML library configuration file is filled with the set of custom input test cases. In selected embodiments, the set of custom inputs for the library model are passed to an input/output matching engine to evaluate a repository of code snippets (e.g., an online hosting service, such as GitHub, for storing a plurality of open source projects) and identify a set of functionally similar code snippets for inclusion in one of the data fields in the library configuration file. In selected embodiments, the information identifying the library model includes a library name, a library function name, one or more library descriptors, a documentation link for the library model, and a method signature for the library model. In addition, the information identifying the library model may include a first list of conditions that will determine a valid match when the when a code snippet output evaluates to true and a second list of conditions that will determine a valid match when the when a code snippet output evaluates to false. In selected example embodiments, the descriptors include a library function code type descriptor, an embedded video tutorial link descriptor, a maven repository link descriptor for the library model, a library source code link descriptor for the library model, a library function summary descriptor, a code line number descriptor for adding the library model, and a code snippet advantages descriptor for the library model. Once generated, the library configuration file is then submitted to a validator which validates the library configuration file to ensure that the library model is correctly formatted and satisfies predetermined library model constraints. In selected embodiments, a YAML format library configuration file is evaluated with a YAML validator to ensure that the library model is correctly formatted and satisfies predetermined library model constraints. For example, the YAML validator may use a python package for checking that the YAML format library configuration file is correctly formatted, for performing a validity check on the set of code snippets, and for performing a validity check on the set of custom inputs to ensure that the library model satisfies predetermined library model constraints. Finally, the library model is added to the library knowledge base if the library configuration file is correctly formatted and satisfies predetermined library model constraints.

The present invention may be a system, a method, and/or a computer program product such that selected embodiments include software that performs certain tasks. The software discussed herein may include script, batch, or other executable files. The software may be stored on a machine-readable or computer-readable storage medium, and is otherwise available to direct the operation of the computer system as described herein and claimed below. In one embodiment, the software uses a local or database memory to implement the data transformation and data structures so as to automatically generate and add libraries to a library knowledge base for use in detecting library substitution opportunities, thereby improving the quality and robustness of software and educating developers about library opportunities and implementation to generate more readable, reliable, smaller, and robust code with less effort. The local or database memory used for storing firmware or hardware modules in accordance with an embodiment of the invention may also include a semiconductor-based memory, which may be permanently, removably or remotely coupled to a microprocessor system. Other new and various types of computer-readable storage media may be used to store the modules discussed herein. Additionally, those skilled in the art will recognize that the separation of functionality into modules is for illustrative purposes. Alternative embodiments may merge the functionality of multiple software modules into a single module or may impose an alternate decomposition of functionality of modules. For example, a software module for calling sub-modules may be decomposed so that each sub-module performs its function and passes control directly to another sub-module.

In addition, selected aspects of the present invention may take the form of an entirely hardware embodiment, an entirely software embodiment (including firmware, resident software, micro-code, etc.), or an embodiment combining software and/or hardware aspects that may all generally be referred to herein as a "circuit," "module" or "system." Furthermore, aspects of the present invention may take the form of computer program product embodied in a computer readable storage medium or media having computer readable program instructions thereon for causing a processor to carry out aspects of the present invention. Thus embodied, the disclosed system, a method, and/or a computer program product is operative to improve the design, functionality and performance of software programs by adding libraries for use in automatically detecting and recommending library function substitutions for replacing validated code snippets in the software program.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Visual Basic.net, Ruby, Smalltalk, C++ or the like, and conventional procedural programming languages, such as the "C" programming language, Hypertext Precursor (PHP), or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a sub-system, module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system described above is for purposes of example only, and may be implemented in any type of computer system or programming or processing environment, or in a computer program, alone or in conjunction with hardware. Various embodiments of the present may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. The system and method for adding library models may be implemented in any type of computer system or programming or processing environment. It is contemplated that the system and method for adding library models might be run on a stand-alone computer system, such as the one described above. The system and method for adding library models might also be run from a server computer systems system that can be accessed by a plurality of client computer systems interconnected over an intranet network. Finally, the system and method for adding library models may be run from a server computer system that is accessible to clients over the Internet.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for adding a library model to a library knowledge base, comprising:
receiving, by a device comprising a processor and a memory, a software program to be submitted as a library model;
generating, by the device, a library configuration file by filling a configuration file template with extracted data to automatically populate a plurality of data fields in the library configuration file with information identifying the library model, where:
(i) one or more of the data fields are filled by (A) scraping a documentation page for the library model to extract test cases, and (B) then scraping each test case to extract a set of custom input test cases for inclusion in the one or more data fields of the library configuration file, and
(ii) generating the library configuration file further comprises extracting the test cases and checking an absolute path name for each extracted test case for a test keyword and checking if one or more specified test library types are used or imported in the test case;
submitting, by the device, the library configuration file to a validator which validates the library configuration file to ensure that the library model is correctly formatted and satisfies predetermined library model constraints; and
adding the library model to the library knowledge base if the library configuration file is correctly formatted and satisfies predetermined library model constraints.

2. The method of claim 1, where generating the library configuration file comprises extracting the set of custom input test cases by parsing and pruning the extracted test cases, finding parameters to the candidate library model which will provide test cases with a required diversity, breadth and depth, and resolving the parameters and imports for each extracted test case.

3. The method of claim 1, where the configuration file template comprises a YAML Ain't Markup Language (YAML) format configuration file template and where generating the library configuration file comprises conducting an iterative sequence of operations to retrieve, scrape or extract data to automatically populate the plurality of data fields in the YAML format configuration file template.

4. The method of claim 3, where conducting the iterative sequence of operations comprises performing a first iterative pass to generate an initial version of the YAML library configuration file template in which only a subset of the plurality of data fields is filled with extracted data, and then performing a second iterative pass to generate a final version of the YAML library configuration file template in which one of the data fields in the YAML library configuration file is filled with the set of custom input test cases.

5. The method of claim 1, where the set of custom input test cases are passed to an input/output matching engine to evaluate a repository of code snippets and identify a set of functionally similar code snippets for inclusion in one or more data fields in the library configuration file.

6. The method of claim 5, where the repository of code snippets comprises an online hosting service for storing a plurality of open source projects.

7. The method of claim 1, where the information identifying the library model comprises a library name, a library function name, one or more library descriptors, a documentation link for the library model, and a method signature for the library model.

8. The method of claim 7, where the one or more library descriptors comprises a library function code type descriptor, an embedded video tutorial link descriptor, a maven repository link descriptor for the library model, a library source code link descriptor for the library model, a library function summary descriptor, a code line number descriptor for adding the library model, and a code snippet advantages descriptor for the library model.

9. The method of claim 1, where the information identifying the library model comprises a first list of conditions that will determine a valid match when a code snippet output evaluates to true and a second list of conditions that will determine a valid match when the code snippet output evaluates to false.

10. A non-transitory, computer program product comprising at least one recordable medium having stored thereon executable instructions and data which, when executed by at least one processing device, cause the at least one processing device to:

receive a software program to be submitted as a library model;

generate a library configuration file by filling a configuration file template with extracted data to automatically populate a plurality of data fields in the library configuration file with information identifying the library model, where:

(i) one or more of the data fields are filled by (A) scraping a documentation page for the library model to extract test cases, and (B) then scraping each test case to extract a set of custom input test cases for inclusion in the one or more data fields of the library configuration file, and (ii) generate the library configuration file further comprises extracting the test cases and checking an absolute path name for each extracted test case for a test keyword and checking if one or more specified test library types are used or imported in the test case;

submit the library configuration file to a validator which validates the library configuration file to ensure that the library model is correctly formatted and satisfies predetermined library model constraints; and add the library model to the library knowledge base if the library configuration file is correctly formatted and satisfies predetermined library model constraints.

11. The non-transitory, computer program product of claim 10, wherein the executable instructions, when executed on the system, cause the at least one processing device to generate the library configuration file by extracting the set of custom input test cases by parsing and pruning the extracted test cases, finding parameters to the candidate library model which will provide test cases with a required diversity, breadth and depth, and resolving the parameters and imports for each extracted test case.

12. The non-transitory, computer program product of claim 10, where the configuration file template comprises a YAML format configuration file template and where generating the library configuration file comprises conducting an iterative sequence of operations to retrieve, scrape or extract data to automatically populate the plurality of data fields in the YAML format configuration file template.

13. The non-transitory, computer program product of claim 12, wherein conducting the iterative sequence of operations comprises performing a first iterative pass to generate an initial version of the YAML library configuration file template in which only a subset of the plurality of data fields is filled with extracted data, and then performing a second iterative pass to generate a final version of the YAML library configuration file template in which one of the data fields in the YAML library configuration file is filled with the set of custom input test cases.

14. The non-transitory, computer program product of claim 10, where the set of custom input test cases are passed to an input/output matching engine to evaluate a repository of code snippets and identify a set of functionally similar code snippets for inclusion in one or more data fields in the library configuration file.

15. A system comprising:
one or more processors;
a memory coupled to at least one of the processors; and
a set of instructions stored in the memory and executed by at least one of the processors to enhance operable functionality of a software program by adding a library model to a library knowledge base, wherein the set of instructions are executable to perform actions of:

receiving a software program to be submitted as a library model;

generating a library configuration file by filling a configuration file template with extracted data to automatically populate a plurality of data fields in the library configuration file with information identifying the library model, where:

(i) one or more of the data fields are filled by (A) scraping a documentation page for the library model to extract test cases, and (B) then scraping each test case to extract a set of custom input test cases for inclusion in the one or more data fields of the library configuration file, and (ii) generating the library configuration file further comprises extracting the test cases and checking an absolute path name for each extracted test case for a test keyword and checking if one or more specified test library types are used or imported in the test case;

submitting the library configuration file to a validator which validates the library configuration file to ensure that the library model is correctly formatted and satisfies predetermined library model constraints; and adding the library model to the library knowledge base if the library configuration file is correctly formatted and satisfies predetermined library model constraints.

16. The system of claim 15, where generating the library configuration file comprises extracting the set of custom input test cases by parsing and pruning the extracted test cases, finding parameters to the candidate library model which will provide test cases with a required diversity, breadth and depth, and resolving the parameters and imports for each extracted test case.

17. The system of claim 15, where the configuration file template comprises a YAML format configuration file template and where generating the library configuration file comprises conducting an iterative sequence of operations to retrieve, scrape or extract data to automatically populate the plurality of data fields in the YAML format configuration file template.

18. The system of claim 17, where conducting the iterative sequence of operations comprises performing a first iterative pass to generate an initial version of the YAML library configuration file template in which only a subset of the plurality of data fields is filled with extracted data, and then performing a second iterative pass to generate a final version of the YAML library configuration file template in which one of the data fields in the YAML library configuration file is filled with the set of custom input test cases.

19. The system of claim 15, where the set of custom input test cases are passed to an input/output matching engine to evaluate a repository of code snippets and identify a set of functionally similar code snippets for inclusion in one or more data fields in the library configuration file.

* * * * *